US010677098B2

(12) United States Patent
Shirota et al.

(10) Patent No.: US 10,677,098 B2
(45) Date of Patent: Jun. 9, 2020

(54) POSITIONING DEVICE, ROTARY MACHINE WITH SAME, AND POSITIONING METHOD

(71) Applicant: MITSUBISHI HITACHI POWER SYSTEMS, LTD., Kanagawa (JP)

(72) Inventors: Akihiko Shirota, Yokohama (JP); Takeki Nakayama, Yokohama (JP); Shinya Honda, Yokohama (JP); Masaaki Sotokawa, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 552 days.

(21) Appl. No.: 15/545,105

(22) PCT Filed: Feb. 9, 2016

(86) PCT No.: PCT/JP2016/053777
§ 371 (c)(1),
(2) Date: Jul. 20, 2017

(87) PCT Pub. No.: WO2016/132964
PCT Pub. Date: Aug. 25, 2016

(65) Prior Publication Data
US 2018/0283213 A1    Oct. 4, 2018

(30) Foreign Application Priority Data
Feb. 19, 2015   (JP) ................... 2015-030418

(51) Int. Cl.
*F01D 25/24* (2006.01)
*F16B 19/02* (2006.01)
*F16B 41/00* (2006.01)

(52) U.S. Cl.
CPC ............ *F01D 25/246* (2013.01); *F16B 19/02* (2013.01); *F05D 2220/31* (2013.01);
(Continued)

(58) Field of Classification Search
CPC ........ F01D 25/24; F01D 25/243; F01D 25/28; F01D 25/285; F01D 25/26;
(Continued)

(56) References Cited

U.S. PATENT DOCUMENTS 2,247,378 A * 7/1941 Hinrichs ............... F01D 25/246
                                                              415/151
4,112,582 A * 9/1978 Beckershoff ............ F01D 25/24
                                                               33/655
(Continued)

FOREIGN PATENT DOCUMENTS

| CA | 2 860 540 | 7/2013 |
| JP | 61-17104 | 1/1986 |
| WO | 2015/093536 | 6/2015 |

OTHER PUBLICATIONS

International Search Report dated May 10, 2016 in International Application No. PCT/JP2016/053777, with English-language translation.
(Continued)

*Primary Examiner* — Jonathan P Masinick
(74) *Attorney, Agent, or Firm* — Wenderoth, Lind & Ponack, L.L.P.

(57) ABSTRACT

A pin insertion hole is formed in an outer member, and a pin groove is formed in an inner member. A positioning device includes a pin entering the pin insertion hole and the pin groove, and a groove contact member coming in contact with a groove side surface of the pin groove. In one member of the pin and the groove contact member, a position restriction concave portion recessed in a direction away from the other member is formed in a portion facing the other member. In the other member, a claw portion entering the position restriction concave portion and coming into
(Continued)

contact with the position restriction concave portion is formed as a portion of the other member is plastically deformed.

23 Claims, 25 Drawing Sheets

(52) U.S. Cl.
CPC ...... *F05D 2230/64* (2013.01); *F05D 2240/12* (2013.01); *F05D 2240/14* (2013.01); *F05D 2260/36* (2013.01); *F16B 41/002* (2013.01)

(58) Field of Classification Search
CPC ............. F05D 2230/64; F05D 2220/30; F05D 2220/31; F05D 2220/32; F05D 2240/55; F05D 2260/30; F02C 7/20; F02C 7/28
See application file for complete search history.

(56) References Cited

U.S. PATENT DOCUMENTS

| | | | |
|---|---|---|---|
| 4,653,969 A * | 3/1987 | Summerlin | F16B 19/05 411/361 |
| 4,817,417 A * | 4/1989 | Twerdochlib | F16B 19/02 73/660 |
| 6,382,905 B1 * | 5/2002 | Czachor | F01D 11/122 415/9 |
| 7,581,922 B1 * | 9/2009 | Morimoto | F01D 25/26 415/126 |
| 8,052,385 B2 | 11/2011 | Thompson et al. | |
| 8,231,338 B2 * | 7/2012 | Ballard, Jr. | F01D 25/26 415/126 |
| 8,794,587 B2 * | 8/2014 | Cant | F01D 5/3053 248/672 |
| 8,870,533 B2 * | 10/2014 | Casavant | F01D 25/285 415/213.1 |
| 8,894,362 B2 * | 11/2014 | Fretwell | F01D 25/246 29/407.01 |
| 9,739,177 B2 * | 8/2017 | Schaefer | F01D 25/246 |
| 10,563,541 B2 * | 2/2020 | Shirota | F16J 15/04 |
| 2008/0193283 A1 | 8/2008 | Burdgick et al. | |
| 2013/0259646 A1 * | 10/2013 | Feindel | F01D 25/246 415/118 |
| 2013/0294907 A1 * | 11/2013 | Hoffacker | F01D 25/243 415/214.1 |
| 2014/0341728 A1 | 11/2014 | Cloarec et al. | |
| 2016/0305287 A1 * | 10/2016 | Honda | F01D 25/246 |
| 2016/0341069 A1 * | 11/2016 | Inagaki | F04D 17/122 |
| 2019/0218934 A1 * | 7/2019 | Naik | F02C 7/06 |

OTHER PUBLICATIONS

Written Opinion of the International Searching Authority dated May 10, 2016 in International Application No. PCT/JP2016/053777, with English-language translation.

* cited by examiner

POSITIONING DEVICE, ROTARY MACHINE WITH SAME, AND POSITIONING METHOD

TECHNICAL FIELD

The present invention relates to a positioning device that positions an inner member arranged on an inner circumferential side of an outer member and extending in a circumferential direction around an axis with respect to the outer member extending in the circumferential direction around the axis, a rotary machine with the positioning device, and a positioning method.

Priority is claimed on Japanese Patent Application No. 2015-030418, filed Feb. 19, 2015, the content of which is incorporated herein by reference.

BACKGROUND ART

A rotary machine such as a steam turbine, a gas turbine, or a compressor includes a rotor shaft, an outer member such as a casing, and an inner member. The outer member extends m a circumferential direction around the rotor shaft. The inner member is arranged on the inner circumferential side of the outer member and extends in a circumferential direction around the rotor shaft. In such a rotary machine, a positioning device may be used to align a relative position of the inner member with respect to the rotor shaft of which a relative position with respect to the outer member is determined.

Examples of such a positioning device include a device disclosed in Patent Document 1. The positioning device includes a radial pin, a liner, and a bolt. The radial pin enters a pin insertion hole of a casing that is an outer member and a groove of a blade ring that is an inner member. The linens arranged between a distal end portion of the radial pin and a groove side surface of the groove. The bolt fixes the liner to the distal end portion of the radial pin. A groove contact surface in contact with the groove side surface and a pin contact surface in contact with the distal end portion of the radial pin are formed in the liner. Further, a screw insertion hole and a bolt head accommodation concave portion are formed in the liner. The screw insertion hole penetrates from the groove contact surface to the pin contact surface, and a screw portion of the bolt is inserted into the screw insertion hole. The bolt head accommodation concave portion communicates with the screw insertion hole, and a bolt head portion of the bolt is accommodated therein.

CITATION LIST

Patent Document

[Patent Document 1] Japanese Unexamined Utility Model Application, First Publication No. Sho 61-017104

SUMMARY OF INVENTION

Technical Problem

As described above, the positioning device of the technology described in Patent Document 1 includes the radial pin, the liner in which the screw insertion hole, the bolt head accommodation concave portion, and the like are formed, and the bolt that fixes the liner to the radial pin. It is desired to reduce the number of components constituting the apparatus for any apparatus including such a positioning device.

Therefore, an object of the present invention is to provide a positioning device in which the number of components is able to be reduced, a rotary machine including the positioning device, and a positioning method.

The positioning device as a first aspect of the present invention for achieving the above object is a positioning device that positions an inner member arranged on an inner circumferential side of an outer member and extending in a circumferential direction around an axis with respect to the outer member extending in the circumferential direction around the axis, the positioning device including: a pin that enters a pin insertion hole extending from the inner circumferential side to an outer circumferential side of the outer member, and a groove recessed from an outer circumferential side to an inner circumferential side of the inner member; and a groove contact member attached to the pin and coming into contact with a groove side surface of the groove, wherein in one member of the pin and the groove contact member, a position restriction concave portion that is recessed in a direction away from the other member is formed in a portion facing the other member, and a claw portion that enters the position restriction concave portion and comes in contact with the position restriction concave portion is formed in the other member as a portion of the other member is plastically deformed.

In this positioning device, after the pin and the groove contact member are placed so as to lace each other, the portion of the other member is plastically deformed so that this portion enters, as a claw portion, the position restriction concave portion of one member and comes into contact with the position restriction concave portion. As a result, relative movement between the pin and the groove contact member is restricted. Therefore, in the positioning device, a member such as a bolt for fixing the member in contact with the groove side surface of the groove of the inner member to the pin is unnecessary, and the number of components can be reduced.

According to a positioning device as a second aspect of the present invention for achieving the above object, in the positioning device of the first aspect, the pin includes an insertion portion that is inserted into the pin insertion hole of the outer member, and a groove insertion portion that enters the groove of the inner member; the insertion portion forms a columnar shape that is long in a pin axis direction parallel to a pin axis around the pin axis; the groove insertion portion is formed on a distal end side that is one side in the pin axis direction of the insertion portion; a support surface parallel to the pin axis is formed in the groove insertion portion; and a supported surface facing the support surface of the groove insertion portion is formed in the groove contact member.

According to a positioning device as a third aspect of the present invention for achieving the above object, in the positioning device of the second aspect, a tapered reception surface facing a side of the support surface and gradually extending toward the distal end side as the tapered reception surface extends away from the support surface is formed on the distal end side in the insertion portion, and a tapered contact surface that comes into surface contact with the tapered reception surface of the insertion portion is formed in the groove contact member.

In this positioning device, the tapered reception surface gradually extending toward the distal end side as the tapered reception surface extends away from the support surface is formed on the distal end side of the insertion portion of the pin, and the tapered contact surface coming in surface contact with the tapered reception surface is formed in the groove contact member. Therefore, in the positioning device, it is possible to restrict relative movement of the groove contact member with respect to the pin to the base end side opposite to the distal end side in the pin axial direction. Further, in the positioning device, it is possible to restrict relative movement of the groove contact member toward the side away from the support surface of the pin. Therefore, in the positioning device, it is possible to further restrict relative movement of the groove contact member with respect to the pin in conjunction with restriction of relative movement of the groove contact member with respect to the pin by the position restriction concave portion and the claw portion entering the position restriction concave portion.

The support surface of the pin receives a force from the inner member via the supported surface of the groove contact member. Therefore, it is preferable for an area of the support surface and an area of the supported surface to be large in order to withstand the force received from the inner member. In this positioning device, it is not necessary to form a bolt hole into which the bolt is inserted in the support surface of the pin and the supported surface of the groove contact member. Therefore, in the positioning device, it is possible to increase the areas of the support surface of the pin and the supported surface of the groove contact member without changing widths or the like of the support surface of the pin and the supported surface of the groove contact member in contrast with a case in which the bolt hole is formed.

According to a positioning device as a fourth aspect of the present invention for achieving the above object, in the positioning device of the second or third aspect, a facing surface facing a surface of the groove contact member among surfaces of the groove insertion portion, an exposed surface other than the facing surface among the surfaces of the groove insertion portion, and a corner between the facing surface and the exposed surface are formed in the groove insertion portion, and a facing surface facing a surface of the pin among surfaces of the groove contact member, an exposed surface other than the facing surface among the surfaces of the groove contact member, and a corner between the facing surface of the groove contact member and the exposed surface of the groove contact member are formed in the groove contact member, and the position restriction concave portion is formed in a region including the corner of the one member.

In this positioning device, since the position restriction concave portion is formed at the corner of the one member, the position restriction concave portion can be easily formed.

According to a positioning device as a fifth aspect of the present invention for achieving the above object, in the positioning device of the fourth aspect, the exposed surface of the groove insertion portion includes a distal end surface that is formed on the distal end side of the groove insertion portion and is directed to the distal end side; the exposed surface of the groove contact member includes a distal end surface that is formed on the distal end side of the groove contact member and is directed to the distal end side; and the position restriction concave portion is formed in a region including a corner between the distal end surface and the facing surface of the one member.

In this positioning device, it is possible to mainly restrict the movement of the groove contact member on the distal end side thereof using the position restriction concave portion and the claw portion entering the position restriction concave portion. Further, it is possible to mainly restrict the movement of the groove contact member on the base end side thereof using the tapered reception surface formed on the distal end side of the insertion portion of the pin, in other words, on the base end side of the groove insertion portion of the pin, and the tapered contact surface of the groove contact member in surface contact with the tapered reception surface, as described above. Therefore, in the positioning device, it is possible to restrict relative movement of the groove contact member with respect to the pin, on both the distal end side and the base end side of the groove contact member.

According to a positioning device as a sixth aspect of the present invention for achieving the above object, in the positioning device of the fourth or fifth aspect, a concave surface defining the position restriction concave portion forms a portion of an outer circumferential surface of a virtual cylinder centered on a virtual axis that is inclined with respect to both of the facing surface and the exposed surface of the one member.

In this positioning device, the position restriction concave portion can be formed by linearly moving a cylindrical tool in a direction inclined with respect to both of the facing surface and the exposed surface of the one member. Therefore, in the positioning device, the position restriction concave portion can be easily formed. Further, in the positioning device, it is easy to bring the claw portion of the pin into close contact over a wide area of the position restriction concave portion, and the direction of position restriction of the groove contact member using the claw portion of the pin can be set to various directions.

According to a positioning device as a seventh aspect of the present invention for achieving the above object, in the positioning device of any one of the second to sixth aspects, a first engaged portion that is formed on the distal end side of the groove contact member, extends from the distal end surface directed to the distal end side to a base end side opposite to the distal end side, and has a convex shape with respect to the supported surface is formed in the groove contact member; a first engaging portion that is formed on the distal end side of the groove insertion portion, extends from the distal end surface directed to the distal end side to the base end side, and has a concave shape with respect to the support surface is formed in the groove insertion portion; the first engaged portion includes a base end side engaged portion of which the amount of projection with respect to the supported surface is a predetermined amount of projection, and a distal end side engaged portion that is arranged on the distal end side relative to the base end side engaged portion and of which the amount of projection with respect to the supported surface is larger than the predetermined amount of projection; the first engaging portion includes a base end size engaging portion of which the amount of recess with respect to the support surface is a predetermined amount of recess that allows the base end side engaged portion to enter the base end side engaging portion, and a distal end side engaging portion that is arranged on the distal end side relative to the base end side engaging portion and of which the amount of recess with respect to the support surface is an amount of recess that allows the distal end side engaged portion to enter the distal end side engaging portion; and the position restriction concave portion is formed in one of a region including the distal end surface and the distal end side engaging portion of the groove insertion portion, and a region including the distal end surface and the distal end side engaged portion of the groove contact member.

According to a positioning device as an eighth aspect of the present invention for achieving the above object, in the positioning device of any one of the second to sixth aspects, an engaging portion that forms a convex shape or a concave shape with respect to the support surface is formed in the groove insertion portion, and an engaged portion that forms a concave shape or a convex shape with respect to the supported surface and is engaged with the engaging portion is formed in the groove contact member.

In this positioning device, it is possible to restrict relative movement of the groove contact member with respect to the pin by engaging the engaging portion of the groove insertion portion with the engaged portion of the groove contact member. Further, in the positioning device, it is possible to easily and accurately attach the groove contact member to a predetermined position in the pin. Further, when the pin is pulled out from the groove of the inner member and the pin insertion hole of the outer member, it is possible to reduce the likelihood of retention of the groove contact member in the groove.

According to a positioning device as a ninth aspect of the present invention for achieving the above object, in the positioning device of the eighth aspect, the engaging portion of the groove insertion portion includes at least one of a first engaging portion that is long in the pin axis direction and a second engaging portion that is long in a direction parallel to the support surface and perpendicular to the pin axis, and the engaged portion of the groove contact member includes at least one of a first engaged portion which is long in the pin axis direction and with which the first engaging portion is engaged, and a second engaged portion which is long in a direction parallel to the supported surface and perpendicular to the pin axis and with which the second engaging portion is engaged.

According to a positioning device as a tenth aspect of the present invention for achieving the above object, the positioning device of any one of the second to ninth aspects includes a liner arranged between the groove contact member and the pin in the groove, wherein in the groove contact member, a base end surface adjacent to the supported surface and directed to the base end side is formed on the base end side of the supported surface, and the liner includes a liner body that is in contact with at least one of the supported surface and the support surface, and a movement restriction portion that is bent with respect to the liner body and faces the base end surface.

In the positioning device, since the movement restriction portion of the liner faces the base end surface of the groove contact member, it is possible to restrict the relative movement of the liner to the distal end side with respect to the groove contact member. Therefore, in the positioning device, it is possible to restrict dropping of the liner to fee distal end side.

According to a positioning device as an eleventh aspect of the present invention for achieving the above object, in the positioning device of any one of the second to tenth aspects, a concave portion that communicates with the pin insertion hole, has a diameter larger than the pin insertion hole, and is recessed toward the inner circumferential side from the outer circumferential side is formed on the outer circumferential side of the outer member, and the positioning device includes a sealing member that is arranged in the concave portion and prevents fluid present on the inner circumferential side of the outer member from flowing out to the outer circumferential side.

With this positioning device, even in a rotary machine inside which a fluid flows, it is possible to prevent the fluid from flowing from the pin insertion hole of the outer member to the outside.

According to the positioning device as a twelfth aspect of the present invention for achieving the above object, in the positioning device of any one of the second to eleventh aspects, the pin insertion hole of the outer member is a cylindrical hole; the insertion portion of the pin forms a cylindrical shape such that it is insertable into the pin insertion hole; the groove insertion portion includes a side circumferential surface that is a circumferential surface obtained by extending a portion of an outer circumferential surface of the insertion portion in a cylindrical shape, and a surface that is arranged on an inner side relative to a virtual outer circumferential surface obtained by extending the outer circumferential surface of the insertion portion, the groove contact member being attached to the surface; and the groove contact member is located on the inner side relative to the virtual outer circumferential surface when the groove contact member is attached to the groove insertion portion.

In this positioning device, it is possible to easily insert the pin having the groove contact member fixed to the groove insertion portion into the cylindrical pin insertion hole.

According to a positioning device as a thirteenth aspect of the present invention for achieving the above object, the positioning device of any one of the first to ninth aspects includes a liner arranged between the groove contact member and the pin in the groove.

According to a positioning device as a fourteenth aspect of the present invention for achieving the above object, in the positioning device of any one of the first to thirteenth aspects, a concave portion that communicates with the pin insertion hole and is recessed toward the inner circumferential side from the outer circumferential side is formed on the outer circumferential side of the outer member, and the positioning device includes a lid member that closes an opening of the concave portion of the outer member.

In this positioning device, it is possible to prevent the pin from dropping from the pin insertion hole.

According to a positioning device as a fifteenth aspect of the present invention for achieving the above object, in the positioning device of any one of the first to fourteenth aspects, a plurality of position restriction concave portions are formed in the one member of the pin and the groove contact member.

In this positioning device, it is possible to further restrict relative movement between the pin and the groove contact member by inserting the claw portion of the other member into each of the plurality of position restriction concave portions formed in the one member. Further, in the positioning device, when the groove contact member is attached to the pin, one of the plurality of position restriction concave portions can be left as a spare position restriction concave portion without the claw portion inserted therein. Accordingly, when the groove contact member is removed from the pin and the groove contact member is attached to the pin again, the spare position restriction concave portion can be used.

According to a positioning device as a sixteenth aspect of the present invention for achieving the above object, in the positioning device of any one of the first to fifteenth aspects, a deformation assistance concave portion is formed on the side opposite to the position restriction concave portion of the one member with reference to the claw portion in the other member.

In this positioning device, when a portion of the other member is plastically deformed with a tool such as a punch, it is possible to easily apply the tool such as a punch to a position adjacent to the portion of the other member and easily plastically deform the portion of the other member.

A rotary machine as a seventeenth aspect of the present invention for achieving the above object includes the positioning device of any one of the first to sixteenth aspects; the outer member; the inner member; and a rotor that is arranged on the inner circumferential side of the inner member and rotates around the axis.

According to a rotary machine as an eighteenth aspect of the present invention for achieving the above object, in the rotary machine of the seventeenth aspect, the rotor is a steam turbine rotor. That is, the rotary machine may be a steam turbine.

A positioning method as a nineteenth aspect of the present invention for achieving the above object is a positioning method of positioning an inner member arranged on an inner circumferential side of an outer member and extending in a circumferential direction around an axis with respect to the outer member extending in the circumferential direction around the axis, the positioning method including: a preparation step of preparing a positioning device including a pin that enters a pin insertion hole extending from the inner circumferential side to an outer circumferential side of the outer member and a groove recessed from an outer circumferential side to an inner circumferential side of the inner member, and a groove contact member coming into contact with a groove side surface of the groove; an adjusted pin assembly step of assembling an adjusted pin obtained by assembling the groove contact member to the pin; and a positioning device attachment step of inserting the adjusted pin into the pin insertion hole of the outer member and the groove of the inner member, wherein in one member of the pin and the groove contact member to be prepared in the preparation step, a position restriction concave portion that is recessed in a direction away from the other member is formed in a portion facing the other member, and the adjusted pin assembly step includes a member assembly step of placing the groove contact member so as to face the pin and plastically deforming a portion of the other member as a claw portion so as to enter the position restriction concave portion and come into contact with the position restriction concave portion.

In this positioning method, in the member assembly step, the portion of the other member is plastically deformed so that this portion enters, as a claw portion, the position restriction concave portion of the one member and comes into contact with the position restriction concave portion. As a result, relative movement between the pin and the groove contact member is restricted. Therefore, in the positioning method, a member such as a bolt for fixing a member in contact with the groove side surface of the groove of the inner member to the pin, as a component of the positioning device, is unnecessary, and it is possible to reduce the number of components to be prepared in the preparation step.

According to a positioning method as a twentieth aspect of the present invention for achieving the above object, in the positioning method of the nineteenth aspect, the adjusted pin assembly step includes a concave portion formation step of forming the position, restriction concave portion in the one member, and in the member assembly step, the groove contact member is placed so as to face the pin, and a portion of the other member is plastically deformed as a claw portion so as to enter one of the position restriction concave portion already formed before the adjusted pin assembly step and the position restriction concave portion formed in the concave portion formation step.

A positioning method as a twenty-first aspect of the present invention for achieving the above object is a positioning method of positioning an inner member arranged on an inner circumferential side of an outer member and extending in a circumferential direction around an axis with respect to the outer member extending in the circumferential direction around the axis, the positioning method including: a preparation step of preparing a positioning device including a pin that enters a pin insertion hole extending from the inner circumferential side to an outer circumferential side of the outer member and a groove recessed from an outer circumferential side to an inner circumferential side of the inner member, and a groove contact member coming into contact with a groove side surface of the groove; an adjusted pin assembly step of assembling an adjusted pin obtained by assembling the groove contact member to the pin; and a positioning device attachment step of inserting the adjusted pin into the pin insertion hole of the outer member and the groove of the inner member, wherein the adjusted pin assembly step includes: a concave portion formation step of forming, in one member of the pin and the groove contact member, a position restriction concave portion which is recessed in a direction away from the other member in a portion facing the other member; and a member assembly step of placing the groove contact member so as to face the pin, and plastically deforming a portion of the other member as a claw portion so as to enter the position restriction concave portion and come in contact with the position restriction concave portion.

In this positioning method, in the member assembly step, the portion of the other member is plastically deformed so that this portion enters, as a claw portion, the position restriction concave portion of the one member and comes into contact with the position restriction concave portion. As a result, relative movement between the pin and the groove contact member is restricted. Therefore, in the positioning method, a member such as a bolt for fixing a member in contact with the groove side surface of the groove of the inner member to the pin, as a component of the positioning device, is unnecessary, and it is possible to reduce the number of components to be prepared in the preparation step.

According to a positioning method as a twenty-second aspect of the present invention for achieving the above object, in the positioning method of any one of the nineteenth to twenty-first aspects, a plurality of liners are prepared in the preparation step; the adjusted pin assembly step includes a liner selection step of selecting any one of the plurality of liners; and in the member assembly step, the liner selected in the liner selection step is arranged between the pin and the groove contact member, the groove contact member is placed so as to face the pin with the timer therebetween, and a portion of the groove contact member is plastically deformed so as to enter, as a claw portion, the position restriction concave portion.

According to a positioning method as a twenty-third aspect of the present invention for achieving the above object, in the positioning method of any one of the nineteenth to twenty-first aspects, the adjusted pin assembly step includes a thickness adjustment step of adjusting a thickness of the groove contact member, and the member assembly step is executed after the thickness adjustment step.

Advantageous Effects of Invention

According to an aspect of the present invention, it is possible to reduce the number of components of the positioning device.

DESCRIPTION OF EMBODIMENTS

Hereinafter, an embodiment of a positioning device and a rotary machine including the positioning device, and modification examples of the positioning device according to the present invention will be described in detail with reference to the drawings.

Embodiment

First, an embodiment of a positioning device and a rotary machine including the positioning device according to the present invention will be described with reference to FIGS. 1 to 19.

Figure 1:
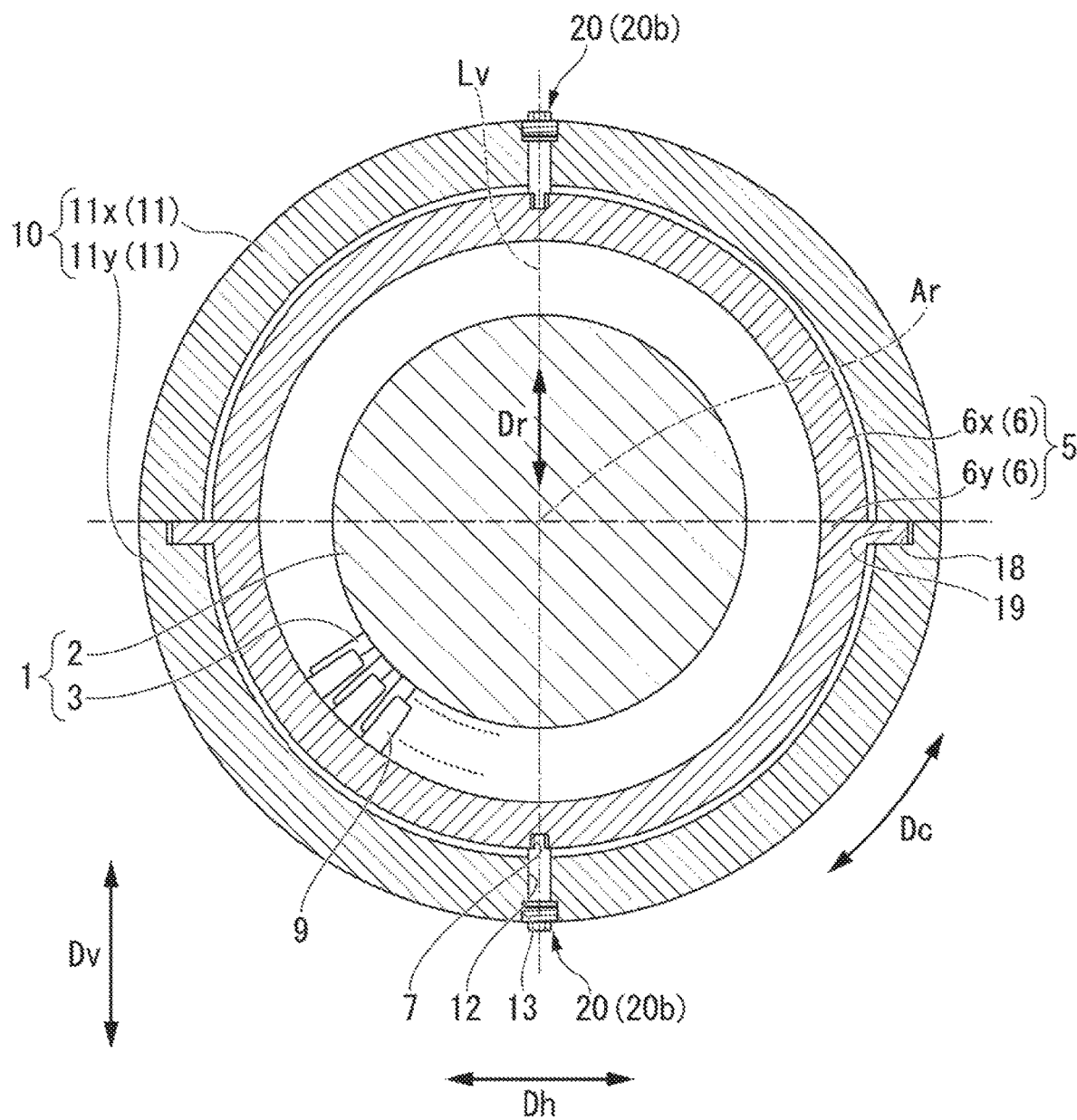
FIG. 1 is a cross-sectional view of a rotary machine in an embodiment of the present invention.

The rotary machine of the embodiment is a steam turbine. The steam turbine includes a rotor (a steam turbine rotor) 1, a blade ring 5, a casing 10, and a positioning device 20, as illustrated in FIG. 1. The rotor 1 rotates about a rotation axis Ar. The blade ring 5 is arranged on the outer circumferential side of the rotor 1 and forms an annular shape around the rotation axis Ar. The casing 10 is arranged on the outer circumferential side of the blade ring 5 and forms an annular shape around the rotation axis Ar. The positioning device 20 determines a relative position of the blade ring 5 with respect to the casing 10. Hereinafter, a direction in which the rotation axis Ar extends is set as an axial direction Da, a radial direction with reference to the rotation axis Ar is simply set as a radial direction Dr, and a circumferential direction with respect to the rotation axis Ar is simply set as a circumferential direction Dc. Further, a horizontal direction perpendicular to the rotation axis Ar is set as a horizontal direction Dh, and a vertical direction perpendicular to the rotation axis Ar is set as a vertical direction Dv.

The rotor 1 includes a rotor shaft 2 that extends in the axial direction Da around the rotation axis Ar, and a plurality of blades 3 arranged in the circumferential direction Dc and fixed to the rotor shaft 2. A plurality of vanes 9 arranged in the circumferential direction Dc are provided in the annular blade ring 5 at positions upstream of the blades 3 of the rotor 1 on the inner circumferential side of the blade ring 5. In the steam turbine, a cylindrical space between the outer circumferential side of the rotor shaft 2 and the inner circumferential side of the annular blade ring 5, in other words, a space in which the blades 3 and the vanes 9 are arranged is a steam channel. The annular blade ring 5 includes an upper half blade ring 6x on the upper side with reference to the rotation axis Ar, and a lower half blade ring 6y on the lower side. The upper half blade ring 6x and the lower half blade ring 6y each form a semicircular arc shape with reference to the rotation axis Ar and are connected to each other by bolts or the like in the end portions in the circumferential direction Dc. Further, the annular casing 10 includes an upper half casing 11x on the upper side with reference to the rotation axis Ar, and a lower half casing 11y on the lower side. Further, the upper half casing 11x and the lower half casing 11y each form a semicircular arc shape with reference to the rotation axis Ar, and are connected to each other by bolts or the like in the end portions in the circumferential direction Dc.

Grooves 18 recessed from the inner circumferential side to the outer circumferential side are formed in the end portions in the circumferential direction Dc of the lower half casing 11y. Further, projections 19 that project toward the outer circumferential side are provided in the end portions in the circumferential direction Dc of the lower half blade ring 6y, and the projections 19 are engaged with the grooves 18. The lower half blade ring 6y is constrained so that the lower half blade ring 6y is not relatively movable in the vertical direction Dv and the axial direction Da with respect to the lower half casing 11y due to the engagement between the projections 19 and the grooves 18. Further, a projection (not illustrated) projecting toward the inner circumferential side over the entire circumference in the circumferential direction Dc is formed on the inner circumferential surface of the lower half casing 11y. Further, a groove portion (not illustrated) recessed toward the inner circumferential side over the entire circumference in the circumferential direction Dc is formed in the outer circumferential surface of the lower half blade ring 6y. The projection is engaged over the entire circumference in the groove. Thus, the lower half blade ring 6y is constrained so as not to be relatively movable in the axial direction Da with respect to the lower half casing 11y. Further, an engagement portion in the circumferential direction is similarly formed in the upper half casing 11x and the upper half blade ring 6x. The lower half blade ring 6y is movable in the horizontal direction Dh with respect to the lower half casing 11y at a time at which the positioning device 20 is not set. Further, the upper half blade ring 6x is also movable in the horizontal direction Dh with respect to the upper half casing 11x at a time at which the positioning device 20 is not set.

In the embodiment, each of the upper half blade ring 6x and the lower half blade ring 6y forms an inner member, and each of the upper half casing 11x and the lower half casing 11y forms an outer member. Hereinafter, the upper half blade ring 6x and the lower half blade ring 6y may be simply referred to as a half blade ring 6, and the upper half casing 11x and the lower half casing 11y may be simply referred to as a half casing 11.

The positioning device 20 includes a lower positioning device 20 that determines a relative position of the lower half blade ring 6y with respect to the lower half casing 11y, and an upper positioning device 20 that determines a relative position of the upper half blade ring 6x with respect to the upper half casing 11x. The upper positioning device 20 and the lower positioning device 20 have the same structure. Therefore, hereinafter, the lower positioning device 20 will be mainly described.

Figure 2:
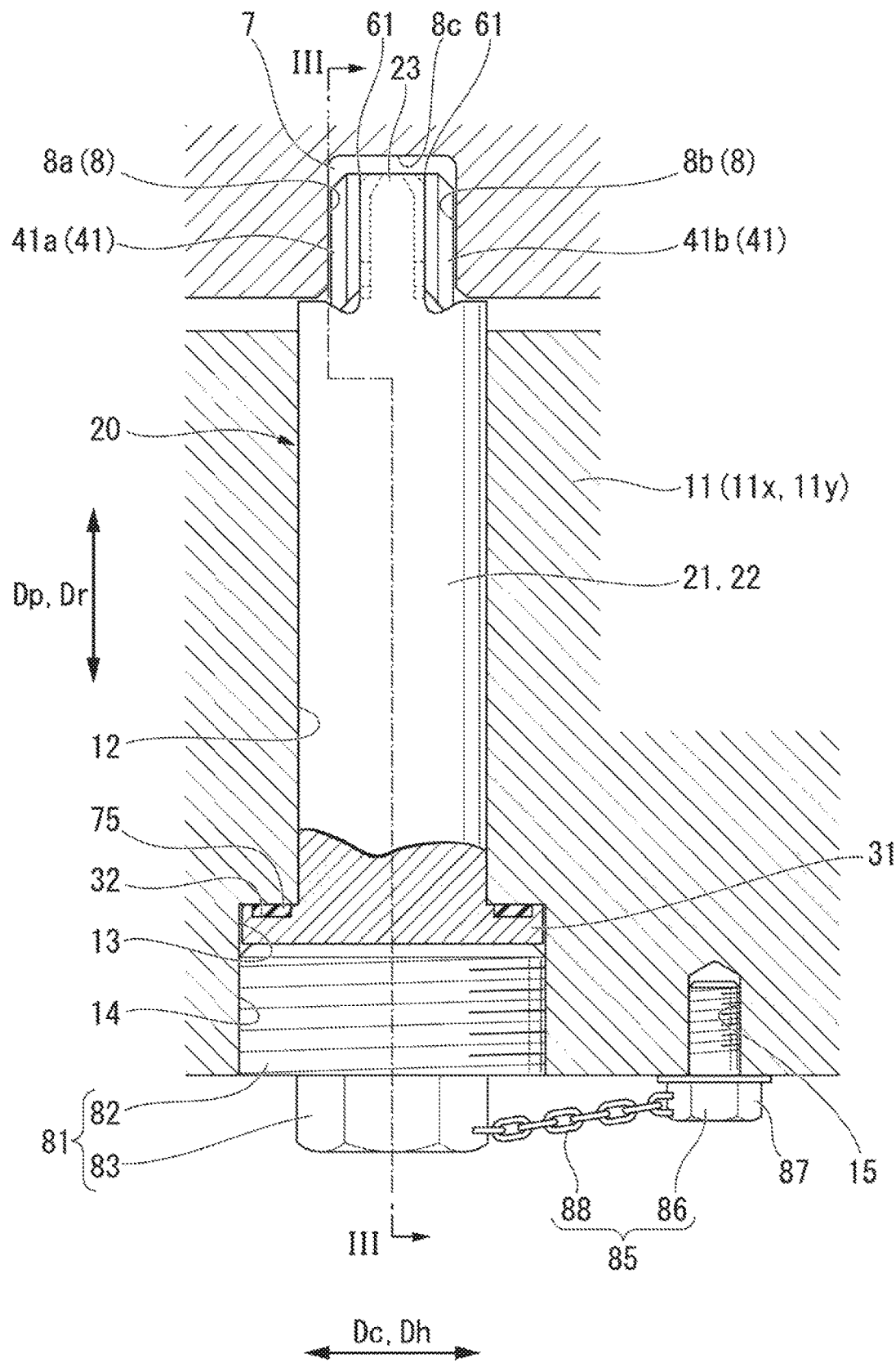
FIG. 2 is an overall side view of a positioning device in the embodiment of the present invention.
Figure 3:
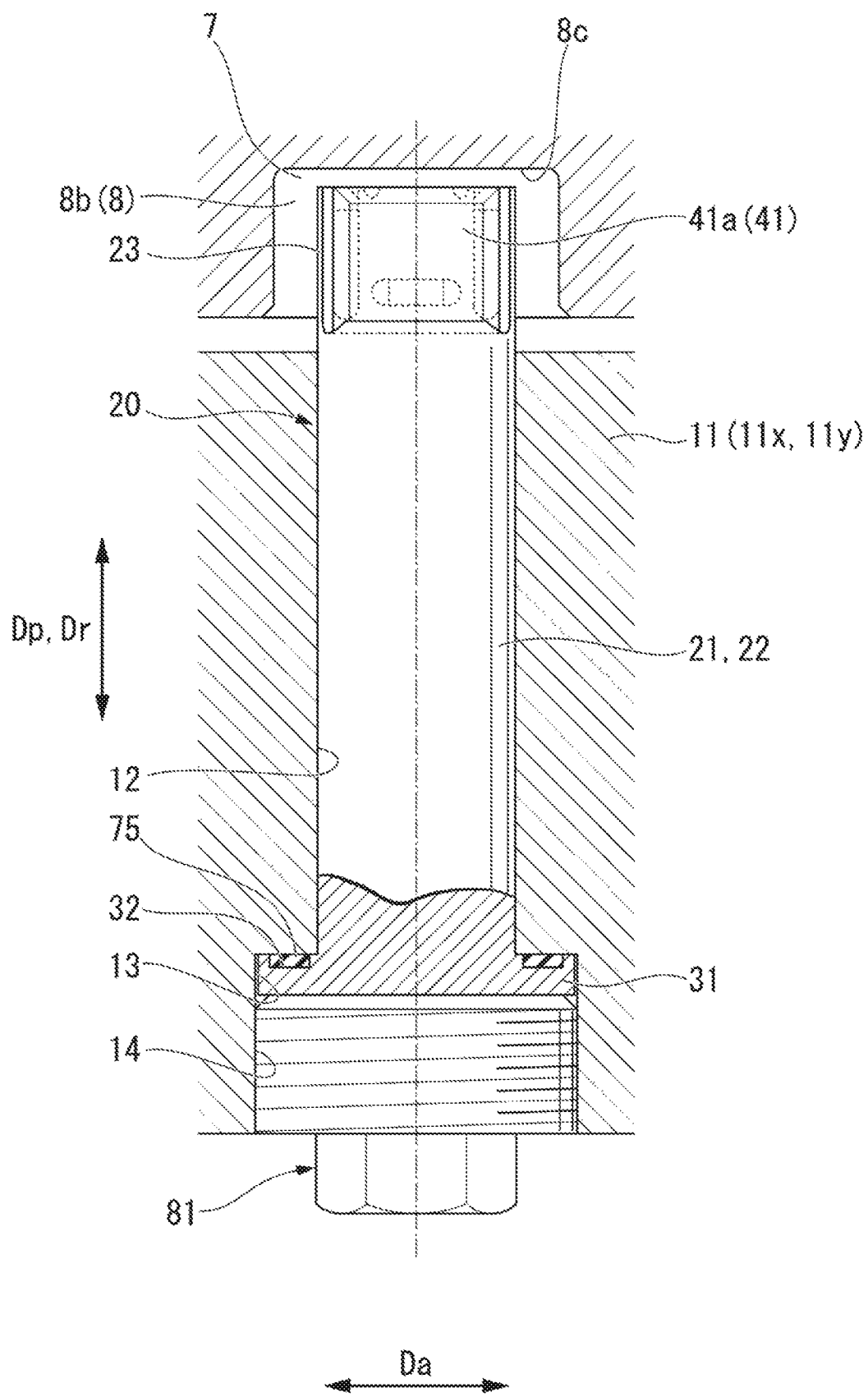
FIG. 3 is a sectional view taken along line III-III in FIG. 2.
Figure 4:
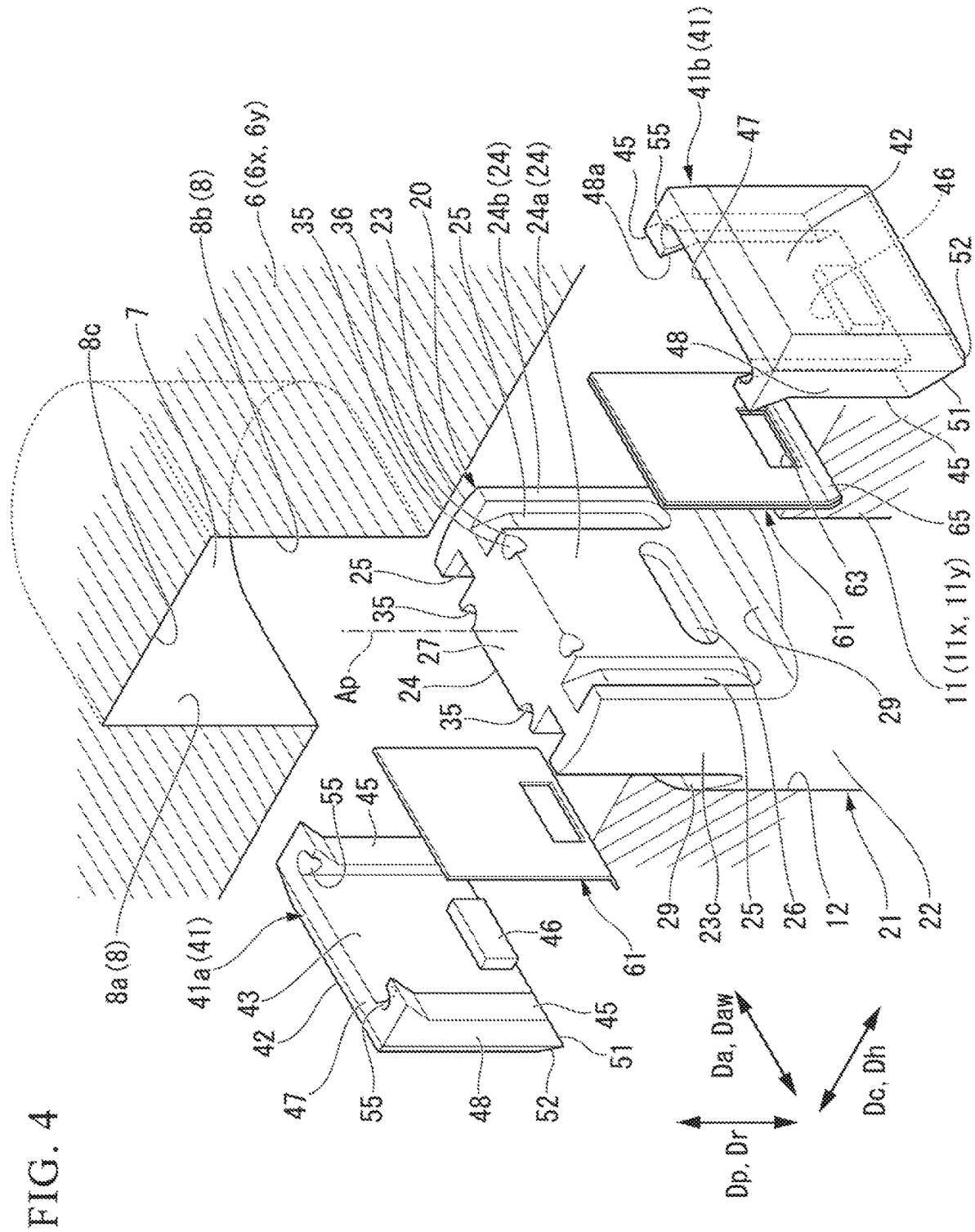
FIG. 4 is an exploded perspective view of main portions of the positioning device in the embodiment of the present invention.

As illustrated in FIGS. 2 to 4, a cylindrical pin insertion hole 12 penetrating from the inner circumferential side to the outer circumferential side, and a flange accommodation concave portion 13 recessed from the outer circumferential side to the inner circumferential side and communicating with the pin insertion hole 12 are formed in the half casing 11. An inner diameter of the flange accommodation concave portion 13 is larger than an inner diameter of the pin insertion hole 12. A female screw 14 is formed in an inner circumferential surface of the flange accommodation concave portion 13. The pin insertion hole 12 penetrates from a bottom surface of the flange accommodation concave portion 13 to the inner circumferential side of the half casing 11.

A pin groove 7 recessed from the outer circumferential side to the inner circumferential side is formed in the half blade ring 6 at a position facing the pin insertion hole 12 of the half casing 11 in the radial direction Dr. The pin groove 7 is defined by a groove bottom surface 8c formed in the half blade ring 6, and a pair of groove side surfaces 8 formed in the half blade ring 6 and facing each other in the horizontal direction Dh, as illustrated in FIGS. 2 and 4.

The pin insertion hole 12 and the flange accommodation concave portion 13 of the half casing 11, and the pin groove 7 of the half blade ring 6 are formed on a vertical line Lv intersecting the rotation axis Ar and extending in the vertical direction, as illustrated in FIG. 1.

The positioning device 20 includes a pin 21, a groove contact member 41, a liner 61, a sealing member 75, a pin pressing screw 81 (lid member), and a loosening stop tool 85, as illustrated in FIGS. 2 to 4. The pin 21 enters the pin insertion hole 12 of the half casing 11 and the pin groove 7 of the half blade ring 6. The groove contact member 41 is in contact with the groove side surface 8 of the pin groove 7. The liner 61 is arranged between the groove contact member 41 and the pin 21 in the pin groove 7. The sealing member 75 seals between the pin 21 and the half casing 11. The pin pressing screw 81 is in contact with a head of the pin 21. The loosening stop tool 85 restricts loosening of the pin pressing screw 81. The groove contact member 41 includes a first groove contact member 41a that is in contact with a first groove side surface 8a of the pair of groove side surfaces 8 of the pin groove 7, and a second groove contact member 41b that is in contact with a second groove side surface 8b.

Figure 5:
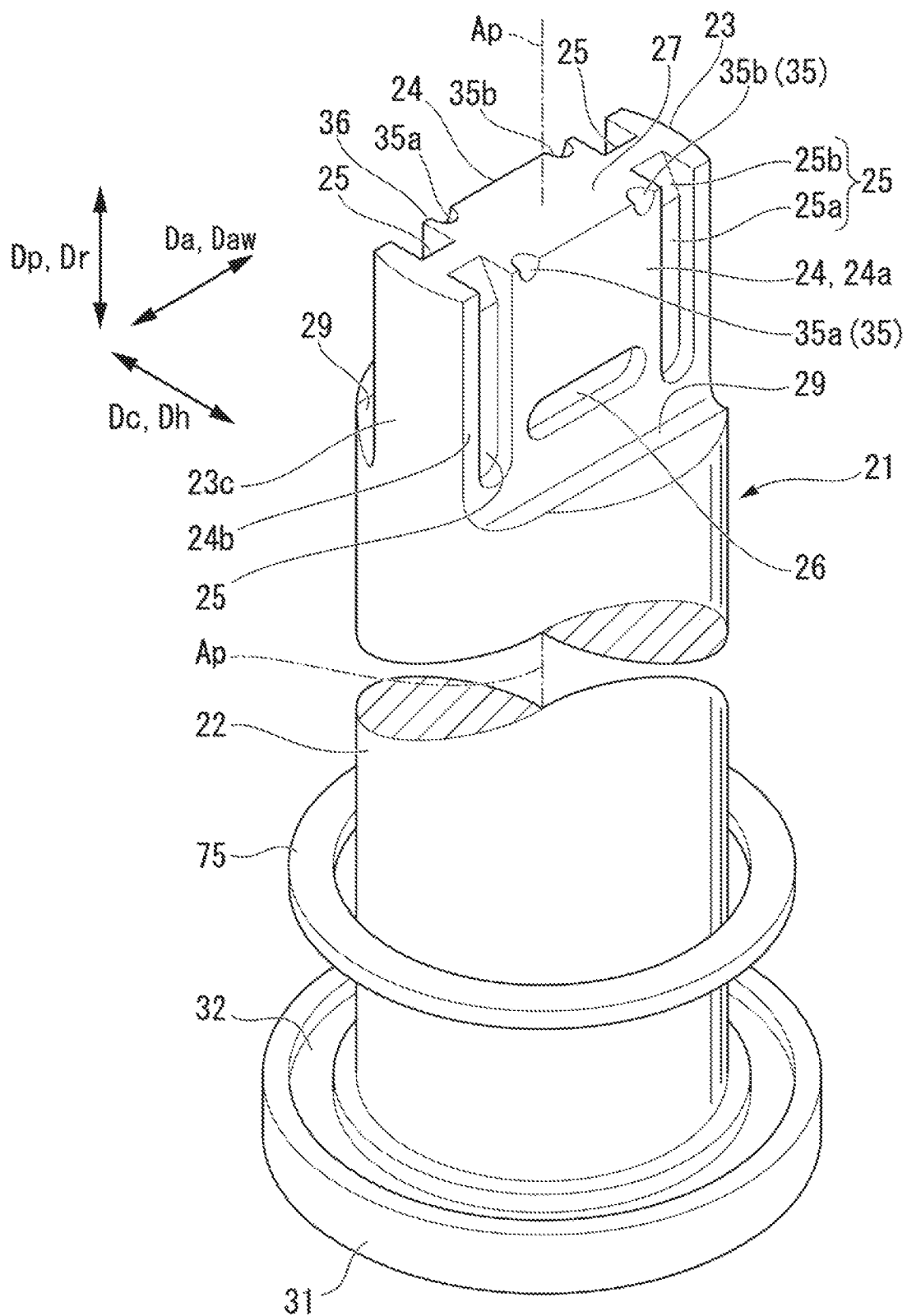
FIG. 5 is a perspective view of a pin in the embodiment of the present invention.

The pin 21 includes a cylindrical insertion portion 22 that is inserted into the pin insertion hole 12 of the half casing 11, a groove insertion portion 23 formed at one of the two ends of the insertion portion 22, and a head flange 31 formed at the other end of the insertion portion 22, as illustrated in FIGS. 2, 4, and 5. Here, a center axis of the cylindrical insertion portion 22 is set as a pin axis Ap, and a direction in which the pin axis Ap extends is set as a pin axis direction Dp. Further, a side on which the groove insertion portion 23 is formed with respect to the insertion portion 22 in the pin axis direction Dp is taken as a distal end side, and a side on which the head flange 31 is formed with respect to the insertion portion 22 in the pin axis direction Dp is taken as a base end side.

A side circumferential surface 23c, a pair of support surfaces 24, and a distal end surface 27 are formed in the groove insertion portion 23. The side circumferential surface 23c is a surface obtained by partially extending the outer circumferential surface of the cylindrical insertion portion 22. The pair of support surfaces 24 are located on the inner side relative to a virtual outer circumferential surface obtained by extending the outer circumferential surface of the insertion portion 22. The distal end surface 27 is formed on the distal end side of the groove insertion portion 23 and is directed to the distal end side. The virtual outer circumferential surface is a virtual surface obtained by extending the outer circumferential surface of the insertion portion 22 in the pin axis direction Dp. The pair of support surfaces 24 are all located on the inner side relative to the virtual outer circumferential surface, and are directed in mutually opposite directions in a direction perpendicular to the pin axis Ap. A groove insertion portion thickness Wd that is an interval between the pair of support surfaces 24 is smaller than a diameter of the cylindrical insertion portion 22. In each of the pair of support surfaces 24, a pair of first engaging concave portions (engaging portions; first engaging portions) 25 and a second engaging concave portion (an engaging portion; a second engaging portion) 26 that are recessed toward the other support surface 24 are formed. The first engaging concave portions 25 are formed such that they are long in the pin axis direction Dp. The first engaging concave portions 25 are formed in the support surface 24 with an interval therebetween in a direction perpendicular to the pin axis direction Dp along the support surface 24. The first engaging concave portion 25 includes a base end side engaging portion 25a of which the amount of recess with respect to the support surface 24 is a predetermined amount of recess, and a distal end side engaging portion 25b arranged on the distal end side relative to the base end side engaging portion 25a. An amount of recess of the distal end side engaging portion 25b gradually increases toward the distal end side from the predetermined amount of recess of the base end side engaging portion 25a. The second engaging concave portion 26 is formed such that it is long in a direction perpendicular to the pin axis direction Dp and along the support surface 24. The second engaging concave portion 26 is formed at a position on the base end side of the support surface 24. The support surface 24 includes a main support surface 24a between the pair of first engaging concave portions 25, and an outer surface 24b opposite to the main support surface 24a with reference to the first engaging concave portion 25.

A deformation assistance concave portion 35 is formed in a region including a corner between one of the pair of support surfaces 24 and the distal end surface 27 and a region including a corner between the other of the pair of support surfaces 24 and the distal end surface 27. The deformation assistance concave portion 35 includes a first assistance concave portion 35a and a second assistance concave portion 35b. The first, assistance concave portion 35a is formed in a region including the corner between the support surface 24 and the distal end surface 27 near one of the pair of first engaging concave portions 25. The second assistance concave portion 35b is formed in a region including the corner between the support surface 24 and the distal end surface 27 near the other of the pair of first engaging concave portions 25.

Facing surfaces that face the surface of the groove contact member 41 among the surfaces of the groove insertion portion 23 include the main support surface 24a, a surface defining the first engaging concave portion 25, and a surface defining the second engaging concave portion 26. On the other hand, exposed surfaces that do not face the surface of the groove contact member 41 among the surfaces of the groove insertion portion 23 are the distal end surface 27, the side circumferential surface 23c, and the outer surface 24b.

A diameter of the cylindrical insertion portion 22 is substantially the same as an inner diameter of the pin insertion hole 12 of the half casing 11. A tapered reception surface 29 gradually extending toward the distal end as the tapered reception surface 29 extends away from the support surface 24 is formed on the distal end side in the insertion portion 22.

The head flange 31 forms a disc shape around the pin axis Ap. A diameter of the head flange 31 is larger than the diameter of the cylindrical insertion portion 22 and the inner diameter of the pin insertion hole 12 of the half casing 11 and smaller than the inner diameter of the flange accommodation concave portion 13 of the half casing 11. An annular seal groove 32 is formed around the pin axis Ap in a surface on which the insertion portion 22 is provided in the head flange 31. The sealing member 75 described above forms an annular shape and a portion of the sealing member 75 enters the seal groove 32.

The pin pressing screw 81 (lid member) includes a screw portion 82 in which a male screw which can be screwed into the female screw 14 formed in the flange accommodation concave portion 13 of the half casing 11 is formed, and a screw head portion 83 formed at an end of the screw portion 82, as illustrated in FIG. 2. The screw head portion 83 forms a hexagonal columnar shape with which a tool such as a wrench can be engaged.

The loosening stop tool 85 includes a loosening stop screw 86 and a wire 88. The loosening stop screw 86 can be screwed into a loosening stop screw hole 15 that is adjacent to the pin insertion hole 12 of the half casing 11. The wire 88 connects the screw head portion 83 of the pin pressing screw 81 to a screw head portion 87 of the loosening stop screw 86. The wire 88 may be directly connected to each of the screw head portion 83 of the pin pressing screw 81 and the screw head portion 87 of the loosening stop screw 86, but may be connected to the screw head portions 83 and 87 of the screws 81 and 86 via the pin 21 fitted in each of the screw head portions 83 and 87.

The first groove contact member 41a and the second groove contact member 41b have the same shape. Therefore, hereinafter, only the first groove contact member 41a will be described. In the first groove contact member 41a, a groove contact surface 42, a supported surface 43, a distal end surface 47, a pair of side surfaces 48, a base end surface 51, a tapered contact surface 52, a first tapered surface 44a, and a pair of second tapered surfaces 44b are formed as illustrated in FIGS. 4 and 6 to 10. The groove contact surface 42 is in contact with the first groove side surface 8a of the pin groove 7. The supported surface 43 is directed opposite to a direction in which the groove contact surface 42 is directed. The distal end surface 47 is formed on the distal end side of the first groove contact member 41a and is directed to the distal end side. The pair of side surfaces 48 are directed to opposite sides. The base end surface 51 is formed on the base end side of the first groove contact member 41a and is directed to the base end side. The tapered contact surface 52 is in surface contact with the tapered reception surface 29 of the pin 21. The first tapered surface 44a is continuous with the groove contact surface 42. The pair of second tapered surfaces 44b are continuous with the groove contact surface 42.

Figure 6:
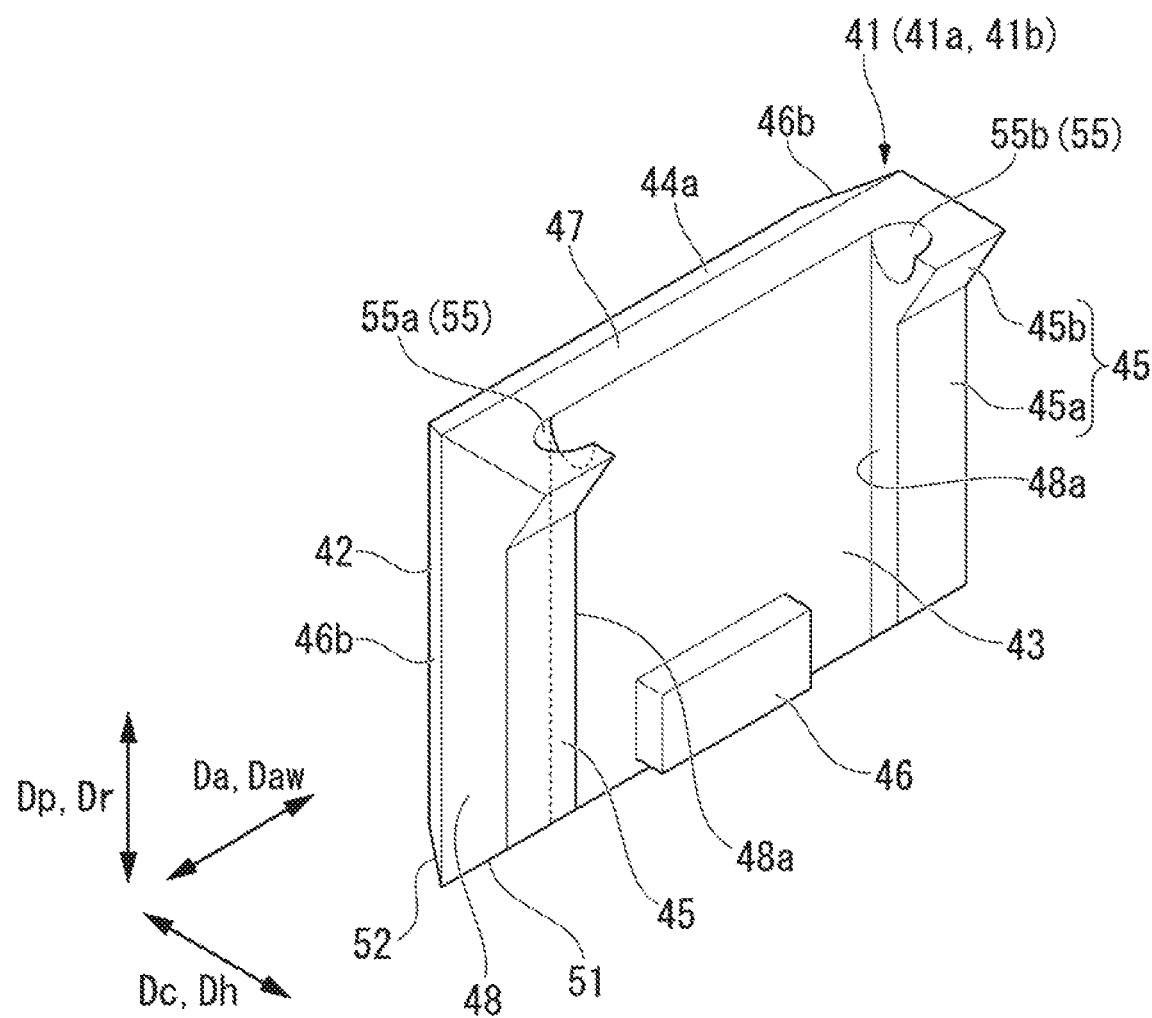
FIG. 6 is a perspective view of a groove contact member in the embodiment of the present invention.
Figure 8:
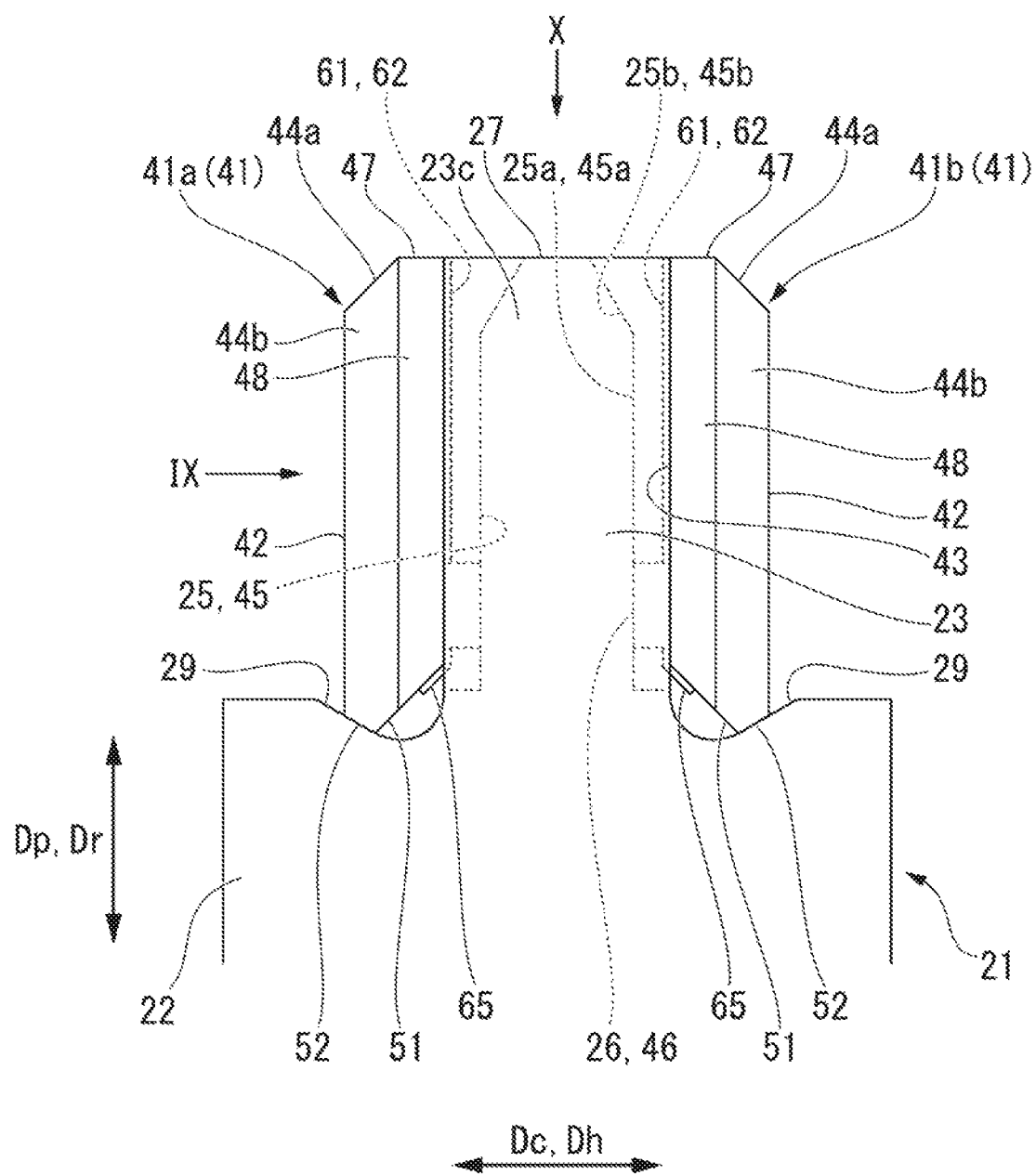
FIG. 8 is a side view of main portions of the positioning device in the embodiment of the present invention.
Figure 9:
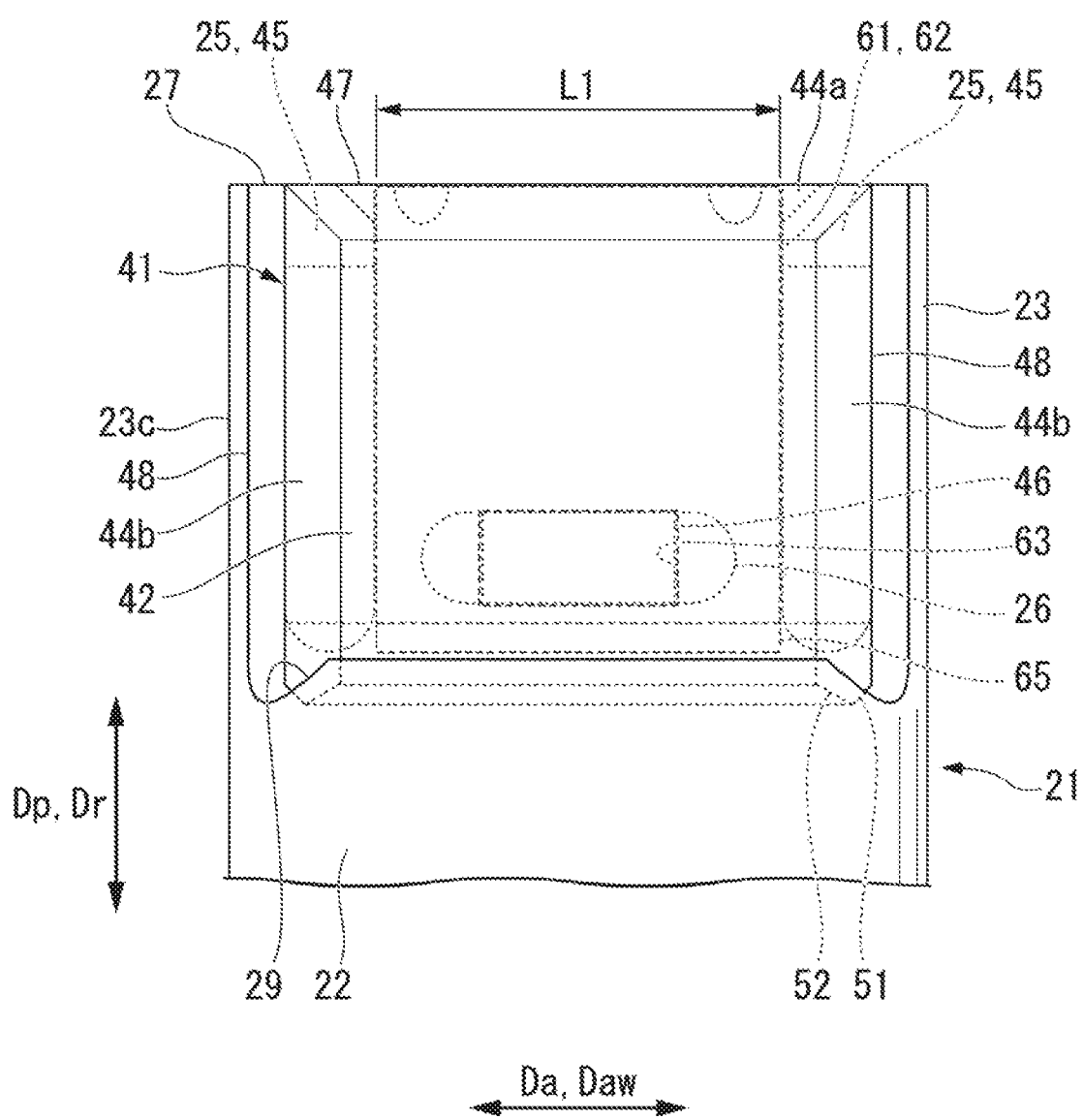
FIG. 9 is a view taken along an arrow IX in FIG. 8.
Figure 10:
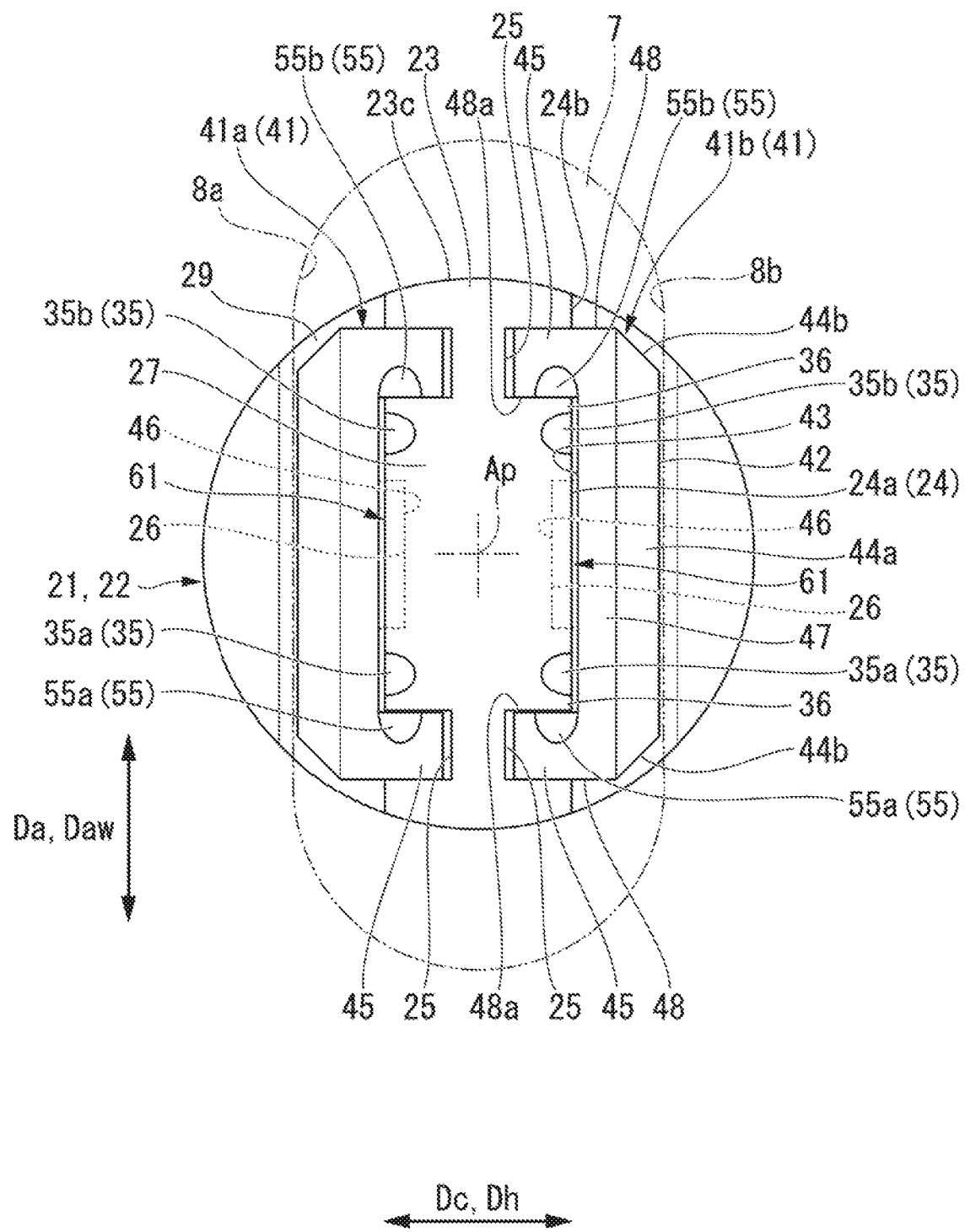
FIG. 10 is a view taken along an arrow X in FIG. 8.

The pair of side surfaces 48 are provided on opposite sides of the first groove contact member 41a in a groove contact member width direction Daw that is a direction perpendicular to the pin axis direction Dp and along the groove contact surface 42 in a state in which the first groove contact member 41a is fixed to the groove insertion portion 23 of the pin 21, as illustrated in FIGS. 6, 9, and 10. The distal end surface 47 is a surface adjacent to the first tapered surface 44a, the second tapered surface 44b, the pair of side surfaces 48, and the supported surface 43. The base end surface 51 is a tapered surface that is continuous with a base end side edge of the supported surface 43 and extends toward the base end as the tapered surface extends away from the supported surface 43 to the groove contact surface 42 as illustrated in FIGS. 6 and 8. The tapered contact surface 52 is a tapered surface that is continuous with the base end side edge of the groove contact surface 42 and gradually extends toward the base end as the tapered surface extends away from the groove contact surface 42 to the supported surface 43. In other words, the tapered contact surface 52 is a tapered surface gradually extending toward the distal end side as the tapered surface extends away from the supported surface 43 to the groove contact surface 42. The first tapered surface 44a is inclined with respect to the groove contact surface 42 such that it gradually approaches the supported surface 43 toward the distal end from the groove contact surface 42. The pair of second tapered surfaces 44b are provided on sides opposite to each other in the groove contact member width direction Daw in the first groove contact, member 41a, as illustrated in FIGS. 6, 9, and 10. The pair of second tapered surfaces 44b are inclined with respect to the groove contact surface 42 such that they gradually extend away from the second tapered surface 44b on the other side as they approach the supported surface 43 from the groove contact surface 42.

Two first engaged convex portions (engaged portions; first engaged portions) 45 and a second engaged convex portion (an engaged portion; a second engaged portion) 46 are formed in the supported surface 43, as illustrated in FIGS. 4, 6, and 8 to 10. The first engaged convex portion 45 is fitted into the first engaging concave portion 25 of the pin 21. The second engaged convex portion 46 is fitted into the second engaging concave portion 26 of the pin 21. The two first engaged convex portions 45 are formed as a pair with an interval therebetween, similarly to the pair of first engaging concave portions 25 of the pin 21. The first engaged convex portion 45 includes a base end side engaged portion 45a of which the amount of projection with respect to the supported surface 43 is a predetermined amount of projection, and a distal end side engaged portion 45b arranged on the distal end side relative to the base end side engaged portion 45a. The amount of projection of the distal end side engaged portion 45b gradually increases toward the distal end side from the predetermined amount of projection of the base end side engaged portion 45a. The base end side engaged portion 45a of the first engaged convex portion 45 enters the base end side engaging portion 25a of the first engaging concave portion 25 in the pin 21. Further, a distal end side engaged portion 45b of the first engaged convex portion 45 enters the distal end side engaging portion 25b of the first engaging concave portion 25 in the pin 21. A pair of convex side surfaces directed to opposite sides in the groove contact member width direction Daw are formed in the first engaged convex portion 45. A portion of the side surface 48 of the first groove contact member 41a forms one convex side surface of the pair of convex side surfaces. The other convex side surface of the pair of convex side surfaces forms a convex inner surface 48a. A width of the second engaged convex portion 46 in the pin axis direction Dp is slightly narrower than the width of the second engaging concave portion 26 of the pin 21 in the pin axis direction Dp. Therefore, even when the second engaged convex portion 46 of the groove contact member 41 is fitted into the second engaging concave portion 26 of the pin 21, the groove contact member 41 is slightly movable relative to the pin 21 in the pin axis direction Dp.

The second groove contact member 41b has the same shape as the first groove contact member 41a, as described above. However, the groove contact surface 42 of the second groove contact member 41b is in contact with the second groove side surface 8b of the pin groove 7.

Figure 7:
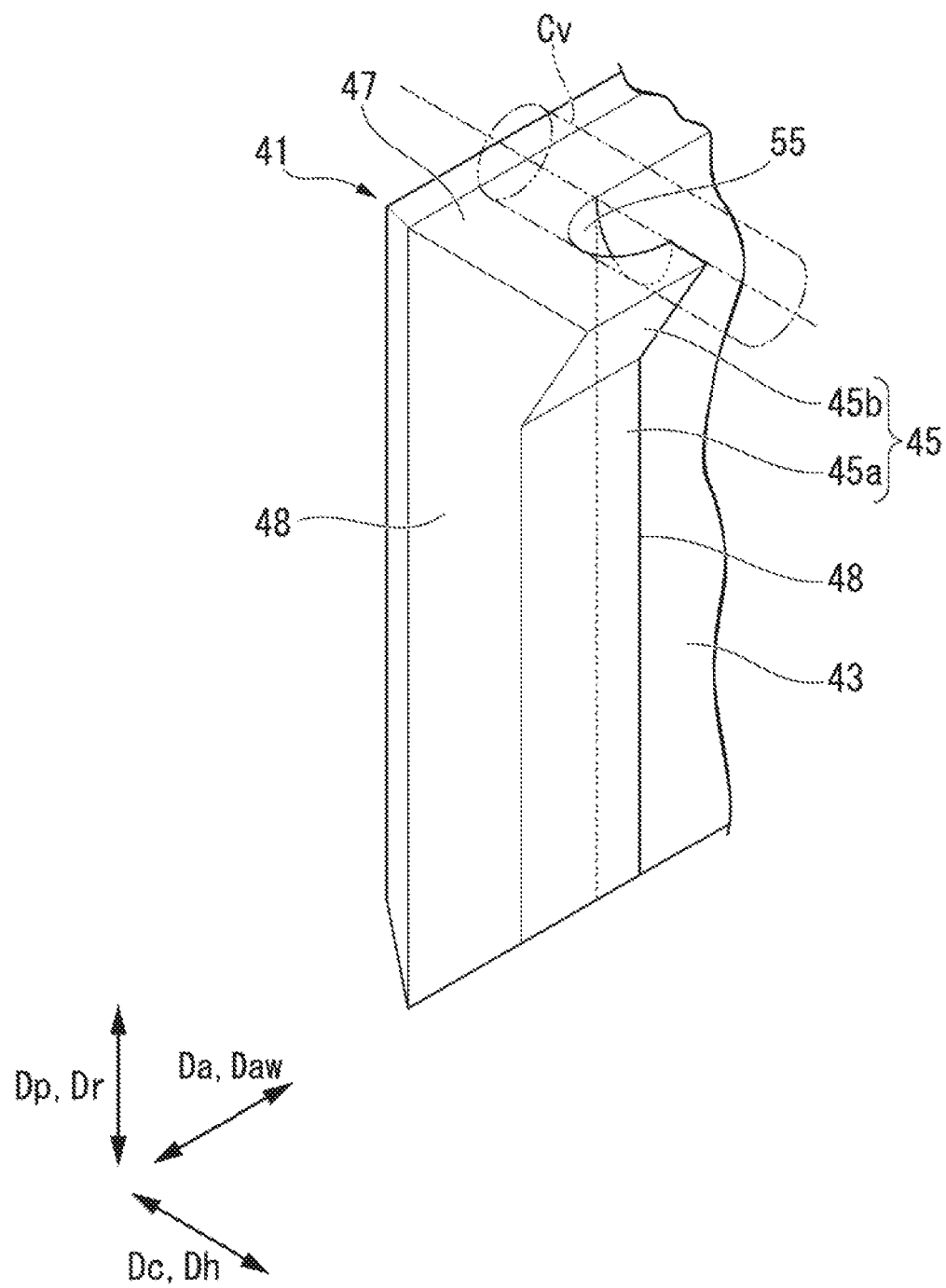
FIG. 7 is an enlarged perspective view of main portions of the groove contact member in the embodiment of the present invention.

A first position restriction concave portion 55a is formed in a region including a corner between the convex inner surface 48a and the distal end surface 47 of one of the pair of first engaged convex portions 45. Further, a second position restriction concave portion 55b is formed in a region including a corner between the convex inner surface 48a and the distal end surface 47 of the other first engaged convex portion 45. Hereinafter, the first position restriction concave portion 55a and the second position restriction concave portion 55b are collectively referred to as the position restriction concave portion 55. The position restriction concave portion 55 is formed by moving a cylindrical tool in a direction inclined with respect to both of the distal end surface 47 and the convex inner surface 48a. Therefore, a concave surface defining the position restriction concave portion 55 forms a portion of the outer circumferential surface of a virtual cylinder Cv centered on a virtual axis parallel to the supported surface 43 and inclined with respect to both of the distal end surface 47 and the convex inner surface 48a, as illustrated in FIG. 7. The first assistance concave portion 35a and the second assistance concave portion 35b of the pin 21 are formed by moving a cylindrical tool in a direction inclined with respect to both the distal end surface 27 and the support surface 24 of the pin 21. Therefore, a concave surface defining the first assistance concave portion 35a and the second assistance concave portion 35b forms a portion of the outer circumferential surface of a virtual cylinder centered on a virtual axis inclined with respect to both the distal end surface 27 and the support surface 24 of the pin 21.

Thus, in the embodiment, since the position restriction concave portion 55 and the deformation assistance concave portion 35 are formed by linearly moving a cylindrical tool, it is possible to easily form the position restriction concave portion 55 and the deformation assistance concave portion 35.

In the embodiment, the position restriction concave portion 55 is formed in a region including a corner between the convex inner surface 48a of the first engaged convex portion 45 and the distal end surface 47, as described above. Therefore, in the embodiment, in order to ensure a region for forming the position restriction concave portion 55 and ensure strength of the vicinity of the position restriction concave portion 55 when a portion of the pin 21 is plastically deformed so as to enter, as a claw portion 37, the position restriction concave portion 55 as will be described below, the amount of projection of the distal end side engaged portion 45b of the first engaged convex portion 45 is made larger than the amount of projection of the base end side engaged portion 45a.

Facing surfaces that face the surface of the pin 21 among the surfaces of the groove contact member 41 include the supported surface 43, a surface forming the first engaged convex portion 45, a surface defining the second engaged convex portion 46, the base end face 51, and the tapered contact surface 52. On the other hand, exposed surfaces that do not face the surface of the pin 21 among the surfaces of the groove contact member 41 include the distal end surface 47, the pair of side surfaces 48, the first tapered surface 44a, and the second tapered surface 44b. However, in the pair of side surfaces 48, a portion forming the convex side surface of the first engaged convex portion 45 is a facing surface, and is not an exposed surface.

Figure 13:
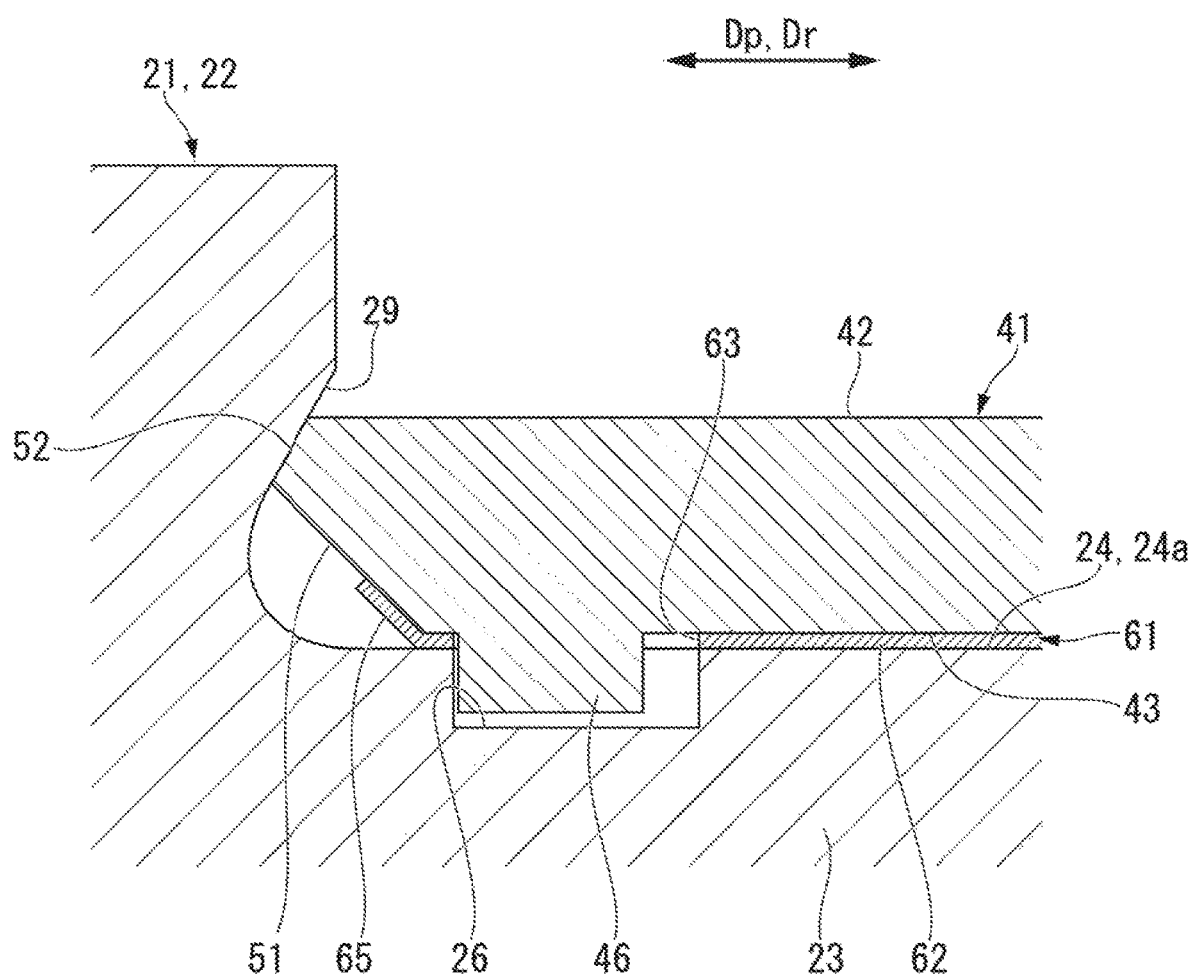
FIG. 13 is a cross-sectional view of main portions after assembly of the positioning device is completed in the embodiment of the present invention.

The liner 61 forms a rectangular plate shape or sheet shape, as illustrated in FIGS. 4, 9, and 13. The liner 61 includes a liner body 62 in contact with the support surface 24 of the pin 21 and/or the supported surface 43 of the groove contact member 41, and a movement restriction portion 65 connected to the base end side edge of the liner body 62. A convex insertion portion 63 into which the second engaged convex portion 46 of the groove contact member 41 is inserted is formed in the liner body 62. The movement restriction portion 65 is bent with respect to the liner body 62. This movement restriction portion 65 faces the base end surface 51 of the groove contact member 41.

A length L1 of a pair of sides facing each other in the pin axis direction Dp of the liner 61 (see FIG. 9) is slightly smaller than an interval between the pair of first engaging concave portions 25 of the pin 21 and an interval between the pair of first engaged convex portions 45 of the groove contact member 41. Therefore, when this liner 61 is arranged between the groove insertion portion 23 of the pin 21 and the groove contact member 41, this liner 61 can be arranged at a position at which the engaging portions 25 and 26 of the groove insertion portion 23 and the engaged, portions 45 and 46 of the groove contact member 41 are avoided. Therefore, in the embodiment, the liner 61 does not easily stick, to the pin 21, and the liner 61 can be easily removed from the pin 21 when the positioning device 20 is removed.

Figure 18:
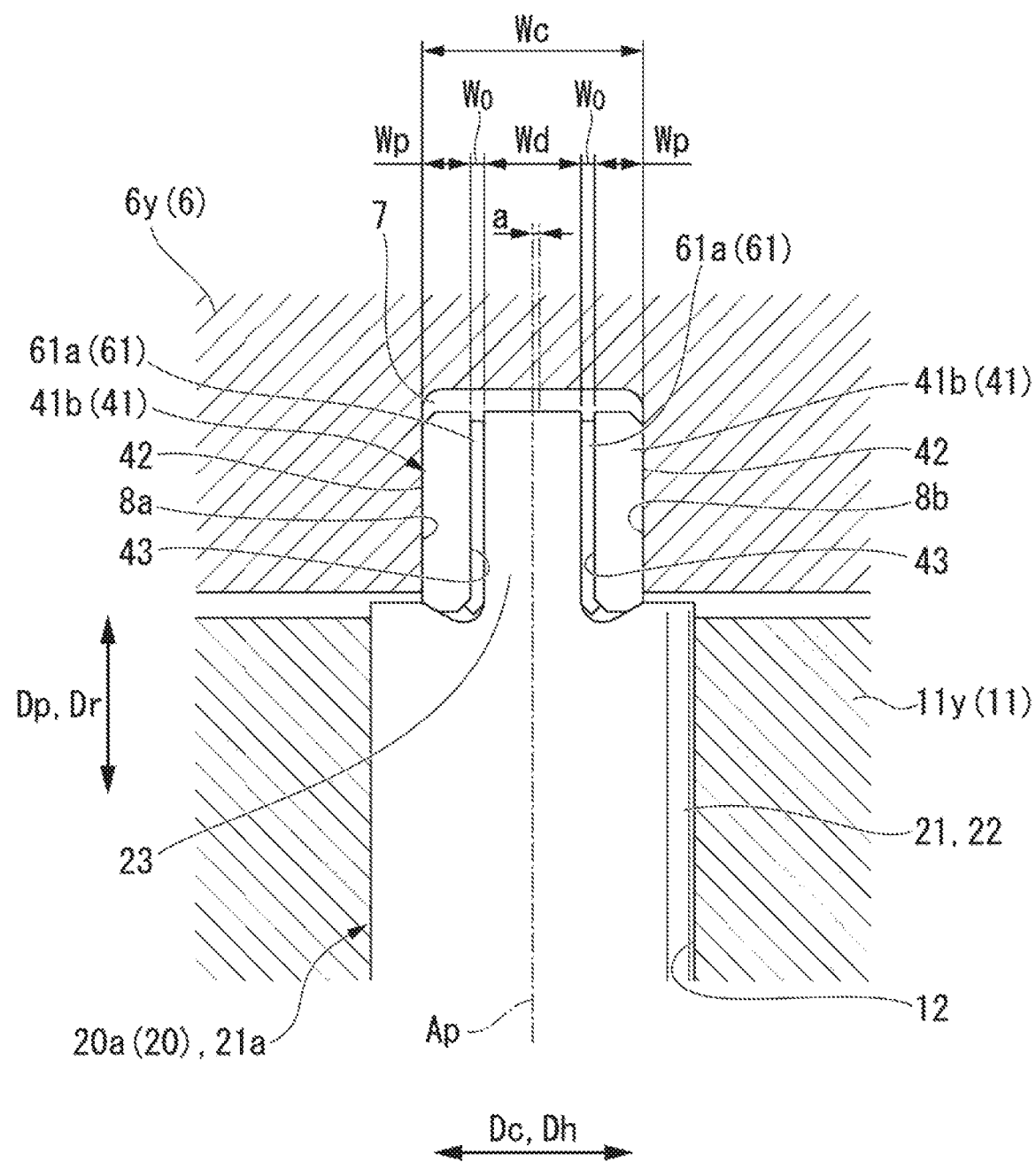
FIG. 18 is a side view of main portions of a provisional positioning device according to the embodiment of the present invention.
Figure 19:
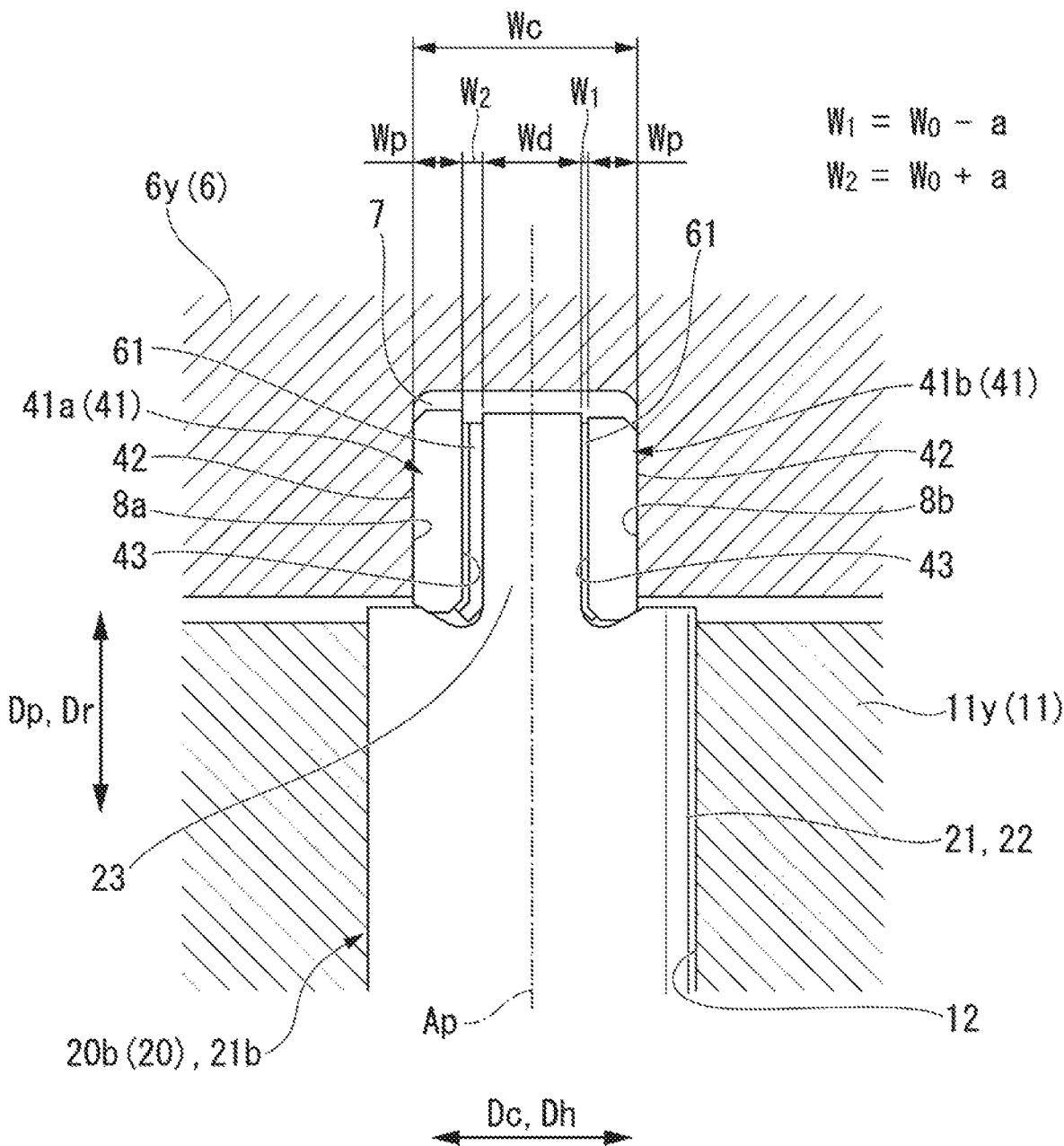
FIG. 19 is a side view of main portions of an adjusted positioning device according to the embodiment of the present invention.

As illustrated in FIGS. 18 and 19, a groove width Wc that is an interval between the first groove side surface 8a and the second groove side surface 8b of the pin groove 7 is larger than a sum of a groove contact member thickness Wp that is an interval between the groove contact surface 42 and the supported surface 43 of the first groove contact member 41a, a groove contact member thickness Wp that is an interval between the groove contact surface 42 and the supported surface 43 of the second groove contact member 41b, and a groove insertion portion thickness Wd of the groove insertion portion 23. The liner 61 includes a plurality of types of liner 61 having different thicknesses. For example, there may be a plurality of each of liners 61 having thicknesses of 0.05 mm, 0.1 mm, 0.2 mm, and 0.3 mm.

Figure 14:
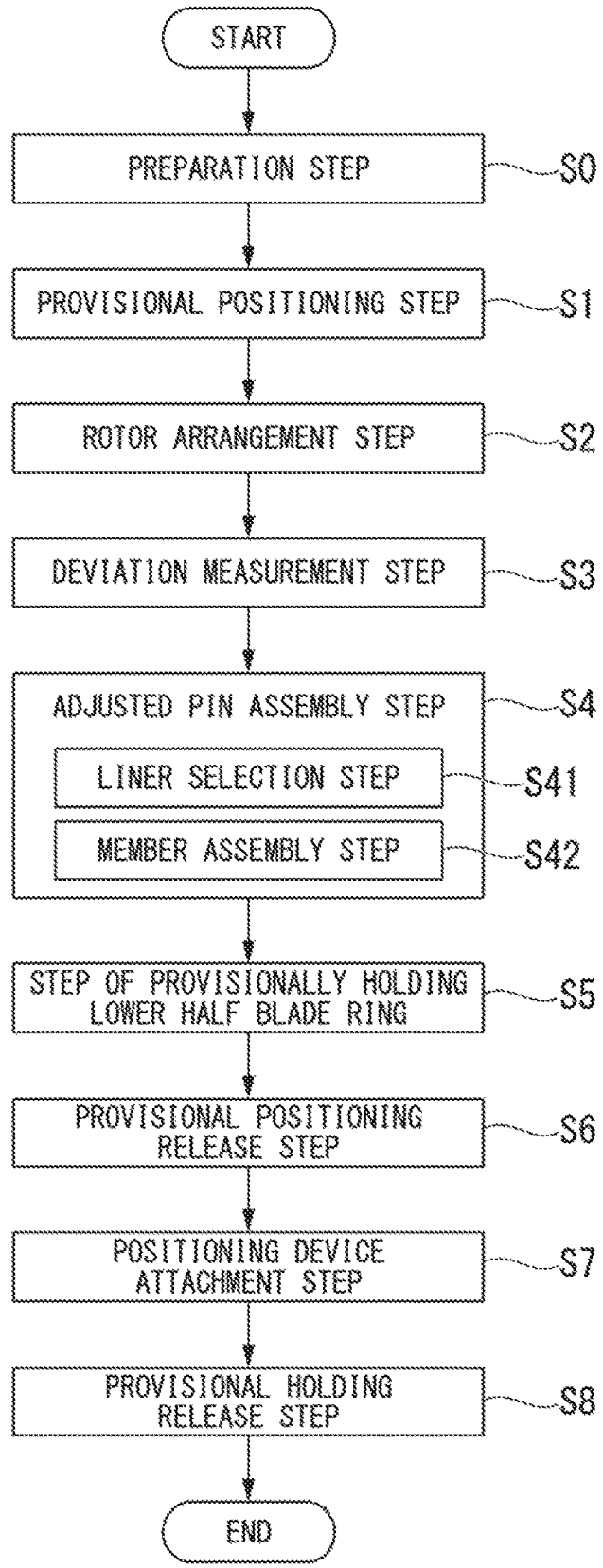
FIG. 14 is a flowchart illustrating a procedure of a positioning method according to the embodiment of the present invention.

Next, a method of positioning the half blade ring 6 using the positioning device 20 described above will be described with reference to the flowchart illustrated in FIG. 14. This positioning is performed when a new steam turbine is installed or when replacement work for the blade ring 5 that is a component of the steam turbine is performed. Further, hereinafter, a method of positioning the tower half blade ring 6y with respect to the lower half casing 11y using the positioning device 20 will be described.

First, the positioning device 20 described above is prepared (S0: preparation step). That is, the pin 21, the liner 61, the groove contact member 41, the sealing member 75, the pin pressing screw 81, and the loosening stop tool 85 constituting the positioning device 20 are prepared. In this case, a plurality of liners 61 having different thicknesses are prepared.

Prior to start of substantial positioning work, the lower half blade ring 6y is removed from the lower half casing 11y. Further, the rotor 1 is not supported by a bearing portion (not illustrated) provided in the lower half casing 11y.

Figure 15:
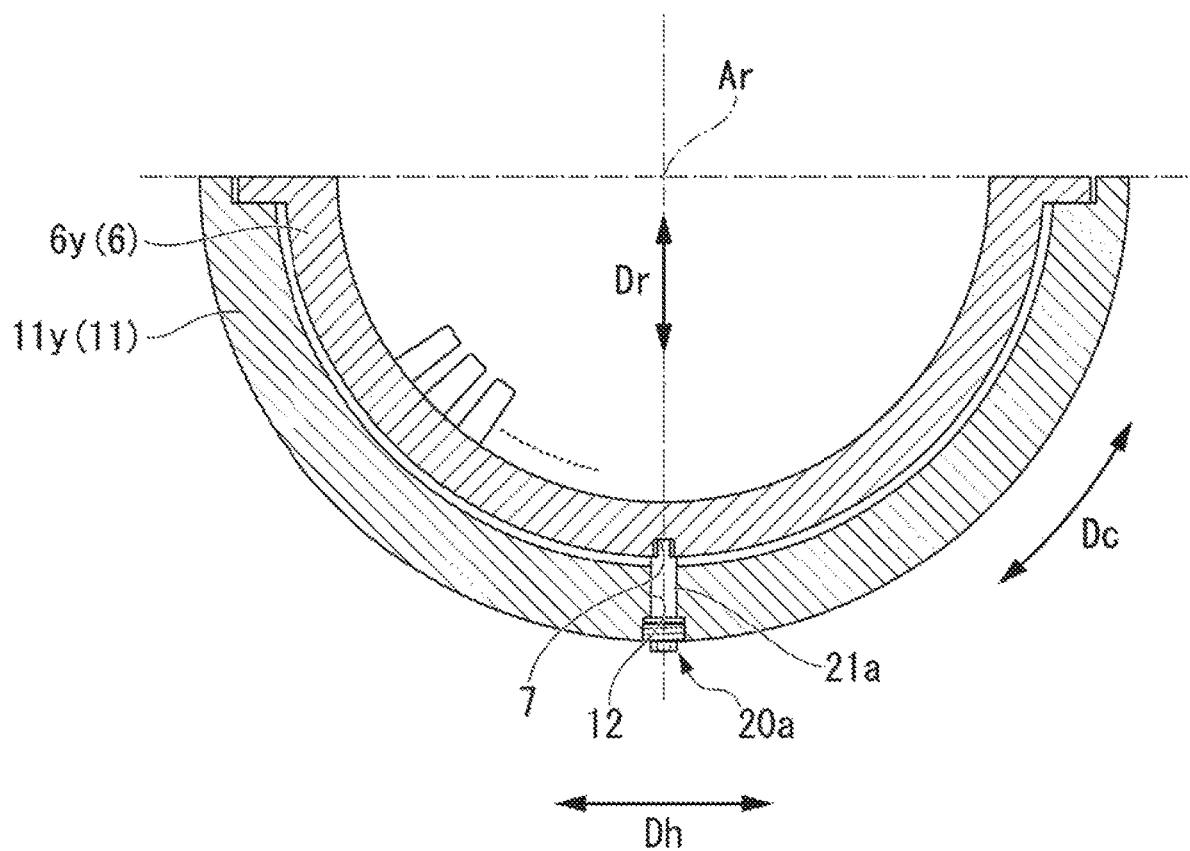
FIG. 15 is an illustrative diagram (part 1) illustrating the positioning method according to the embodiment of the present invention.

At the start of the substantial positioning work, first, the lower half blade ring fey is hung by a crane or the like and accommodated in the lower half casing 11y. In this process, as illustrated in FIG. 15, provisional positioning of the lower half blade ring 6y with respect to the lower half casing 11y in the horizontal direction Dh is performed using a provisional positioning device 20a having a provisional pin 21a (S1: provisional positioning step).

The provisional pin 21a of the provisional positioning device 20a includes the pin 21 in the positioning device 20 of the embodiment, a pair of groove contact members 41, and a pair of prescribed liners 61a having a prescribed thickness, as illustrated in FIG. 18. In this case, for the prescribed thickness of the pair of prescribed liners 61a, a sum of a thickness Wo of the pair of prescribed liners 61a, the groove contact member thickness Wp of the pair of groove contact members 41, and the groove insertion portion thickness Wd of the groove insertion portion 23 of the pin 21 is substantially the same as the groove width Wc of the pin groove 7. The provisional pin 21a includes a cylindrical insertion portion 22 that is inserted into the pin insertion hole 12 of the half casing 11, and a groove insertion portion that is formed at an end of the insertion portion 22, and a thickness of the groove insertion portion may be substantially the same as the groove width Wc of the pin groove 7. That is, an arbitrary provisional pin 21a may be used herein as long as a thickness of a portion thereof entering the pin groove 7 is substantially the same as a groove width Wc of the pin groove 7. It is preferable for this provisional positioning device 20a to be also prepared in the preparation step (S0).

Figure 16:
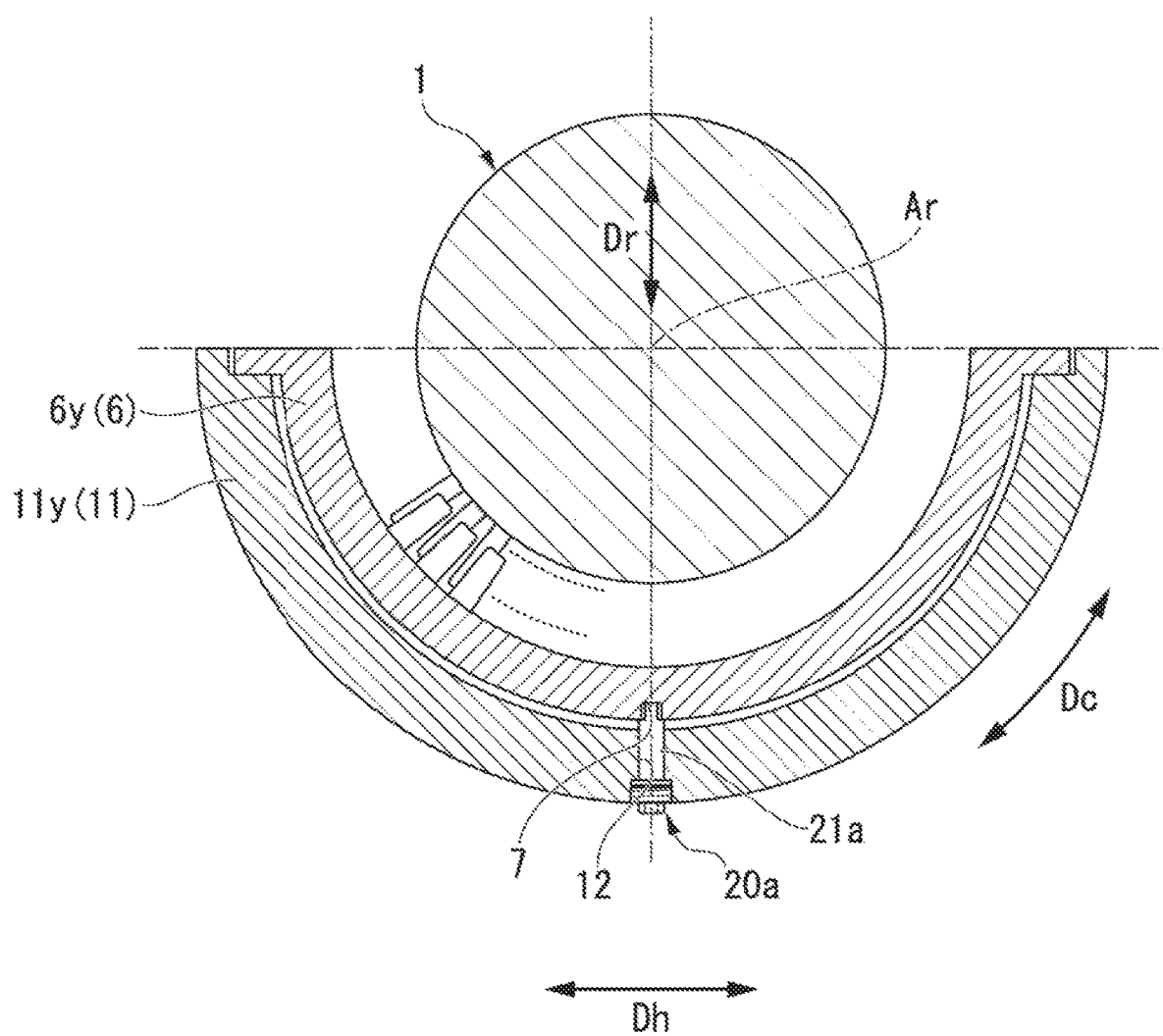
FIG. 16 is an illustrative diagram (part 2) illustrating the positioning method according to the embodiment of the present invention.

Then, the rotor 1 is arranged in the lower half casing 11y using a crane or the like, as illustrated in FIG. 16 (S2: rotor arrangement step). In this process, the rotor 1 is supported by the bearing portion (not illustrated) provided in the lower half casing 11y, and a relative position in the horizontal direction Dh of the rotor 1 with respect to the lower half casing 11y is determined.

Then, a deviation amount in the horizontal direction Dh of the lower half blade ring 6y with respect to the rotor 1 or the lower half casing 11y is measured (S3: deviation measurement step). Since a relative position in the horizontal direction Dh of the rotor 1 with respect to the lower half casing 11y has already been determined, a deviation amount in the horizontal direction Dh of the lower half blade ring 6y with respect to the rotor 1 is the same as a deviation amount in the horizontal direction Dh of the half blade ring 6y with respect to the lower half casing 11y.

Then, the liner 61 having the thickness according to the deviation amount measured in the deviation measurement step (S3) is selected, and the liner 61 is attached to the pin 21 (S4: adjusted pin assembly step). In the adjusted pin assembly step (S4), any one liner 61 is first selected from the plurality of liners 61 (S1: liner selection step). In the liner selection step (S41), for example, the deviation amount in the horizontal direction Dh of the lower half blade ring 6y provisionally positioned by the provisional pin 21a with respect to the lower half casing 11y is assumed to be a, as illustrated in FIG. 18. In this case, thicknesses of the pair of prescribed liners 61a which are components of the provisional pin 21a are both assumed to be Wo. In order to correct this deviation amount a, a thickness W1 of one of the pair of liners 61 may be (Wo−a), and a thickness W2 of the other liner 61 may be (Wo+a), as illustrated in FIG. 19. Therefore, the liner 61 having the thickness W1 of (Wo−a) and the liner 61 having the thickness W2 of (Wo+a) are selected from among the plurality of liners 61 prepared in the preparation step (S0). The liner 61 having the thickness W1 of (Wo−a) and the liner 61 having the thickness W2 of (Wo+a) are not required to be a single liner 61 and may include a plurality of liners 61.

Figure 11:
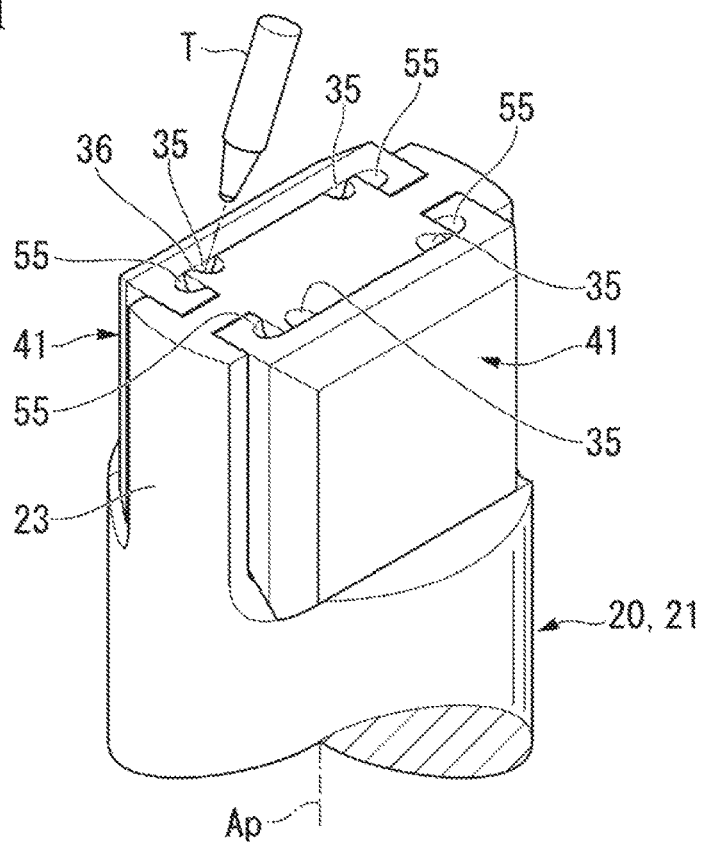
FIG. 11 is a perspective view of main portions in a step of assembling the positioning device in the embodiment of the present invention.
Figure 12:
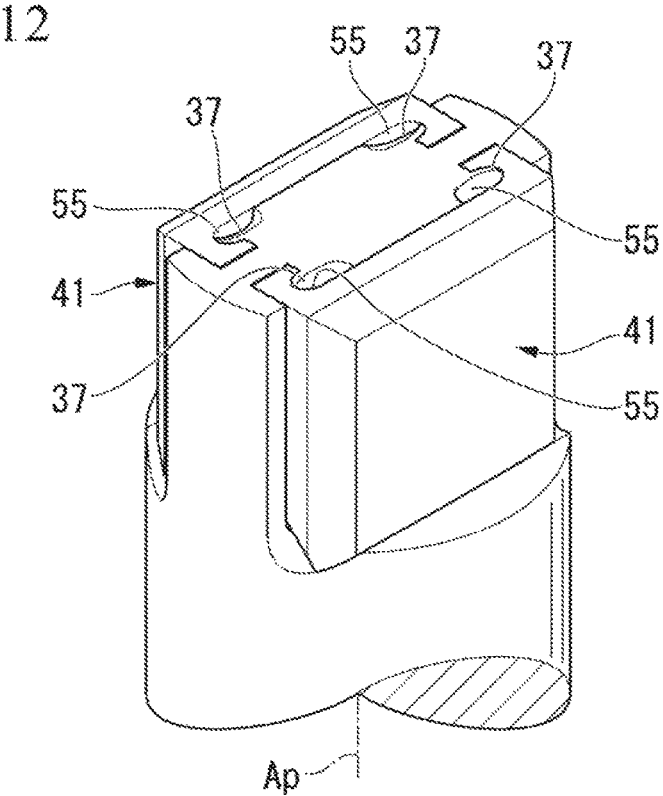
FIG. 12 is a perspective view of main portions after assembly of the positioning device is completed in the embodiment of the present invention.

In the adjusted pin assembly step (S4), after the liner selection step (S41), the selected liner is attached to the groove contact member 41, and then, the groove contact member 41 is attached to the pin 21 (S42: member assembly step). In this member assembly step (S42), first, the liner body 62 of the selected liner 61 is placed so as to face the supported surface 43 of the groove contact member 41, and the movement restriction portion 65 of the liner 61 is placed so as to face the base end surface 51 of the groove contact member 41, as illustrated in FIGS. 4 and 13. Subsequently, the second engaged convex portion 46 of the groove contact member 41 is inserted into the convex insertion portion 63 of the liner 61. Then, the first engaged convex portions 45 of the groove contact member 41 are inserted into the first engaging concave portions 25 of the pin 21, and the second engaged convex portion 46 of the groove contact member 41 is inserted into the second engaging concave portion 26 of the pin 21. Then, by slightly moving the groove contact member 41 to the base end side relative to the pin 21, the tapered contact surface 52 of the groove contact member 41 is brought into surface contact with the tapered reception surface 29 of the pin 21. Then, as illustrated in FIGS. 11 and 12, a distal end of a tool T such as a punch is inserted into the deformation assistance concave portion 35 of the pin 21, and the tool T is tapped with a hammer or the like to plastically deform a portion 36 between the deformation assistance concave portion 35 and the adjacent position restriction concave portion 55 of the groove contact member 41 in the portion of the pin 21 toward this position restriction concave portion 55. This portion 36 of the pin 21 enters, as the claw portion 37, the position restriction concave portion 55 due to the plastic deformation and comes into close contact over a wide range of the concave surface defining the position restriction concave portion 55. That is, the position restriction concave portion 55 of the groove contact member 41 is caulked by the portion 36 of the pin 21.

The adjusted pin assembly step (S4) is then completed, and the selected liner and the groove contact member 41 are attached to the pin 21. Thus, the pin 21 to which the selected liner 61 and the groove contact member 41 are attached forms an adjusted pin 21b.

In a stage in which the adjusted pin assembly step (S4) ends, the tapered contact surface 52 of the groove contact member 41 is in surface contact with the tapered reception surface 29 of the pin 21. Therefore, relative movement of the groove contact member 41 to the base end side with respect to the pin 21 is restricted. Further, since the claw portion 37 of the pin 21 has entered the position restriction concave portion 55 of the groove contact member 41, the relative movement of the groove contact member 41 to the distal end side with respect to the pin 21 is restricted. In this stage, the tapered contact surface 52 on the base end portion side of the groove contact member 41 is in surface contact with the tapered reception surface 29 of the pin 21, and the claw portion 37 of the pin 21 has entered the position restriction concave portion 55 on the distal end portion side of the groove contact member 41. Therefore, relative movement of the groove contact member 41 to a side away from the support surface 24 of the pin 21 with respect to the pin 21 is restricted. Further, in this stage, since the first engaged convex portions 45 of the groove contact member 41 have entered the first engaging concave portions 25 of the pin 21, the relative movement of the groove contact member 41 in the groove contact member width direction Daw with respect to the pin 21 is restricted. Therefore, in this stage, the relative movement of the groove contact member 41 in all directions is restricted with respect to the pin 21. In other words, in this stage, the groove contact member 41 is fixed to the pin 21.

As described above, since the tapered contact surface 52 of the groove contact member 41 is in surface contact with the tapered reception surface 29 of the pin 21, relative movement of the groove contact member 41 to the base end side with respect to the pin 21 and relative movement thereof to the side away from the support surface 24 of the pin 21 are restricted. Further, since the tapered contact surfaces 52 of the groove contact member 41 and the tapered reception surface 29 of the pin 21 are both tapered surfaces, it is possible to cope with a change in the thickness of the liner 61 while restricting relative movement of the groove contact member 41 with respect to the pin 21.

Further, in a stage in which the adjusted pin assembly step (S4) is completed, the liner body 62 is sandwiched between the supported surface 43 of the groove contact member 41 and the support surface 24 of the pin 21. Therefore, relative movement of the liner 61 to the side away from the supported surface 43 of the groove contact member 41 and the relative movement thereof to the side away from the support surface 24 of the pin 21 are restricted. In this stage, the movement restriction portion 65 of the liner 61 is in contact with the base end surface 51 of the groove contact member 41. Thus, the relative movement of the liner 61 to the distal end side with respect to the groove contact member 41 and the pin 21 is restricted. Further, in this stage, the liner 61 is arranged between the pair of first engaged convex portions 45 of the groove contact member 41. Thus, relative movement of the liner 61 in the groove contact member width direction Daw with respect to the groove contact member 41 and the pin 21 is restricted. Therefore, in this stage, relative movement of the liner 61 in all directions with respect to the groove contact member 41 and the pin 21 is restricted. In other words, in this stage, the liner is fixed to the groove contact member 41 and the pin 21.

The groove contact member 41 is located on the inner side relative to the above-described virtual outer circumferential surface obtained by extending the outer circumferential surface of the cylindrical insertion portion 22, in a state in which the liner 61 and the groove contact member 41 are fixed to the groove insertion portion 23 of the pin 21.

Then, the lower half blade ring 6y that has been provisionally positioned is provisionally held by a crane or the like so that the lower half blade ring 6y is movable in the horizontal direction Dh (S5: provisional holding step).

Figure 17:
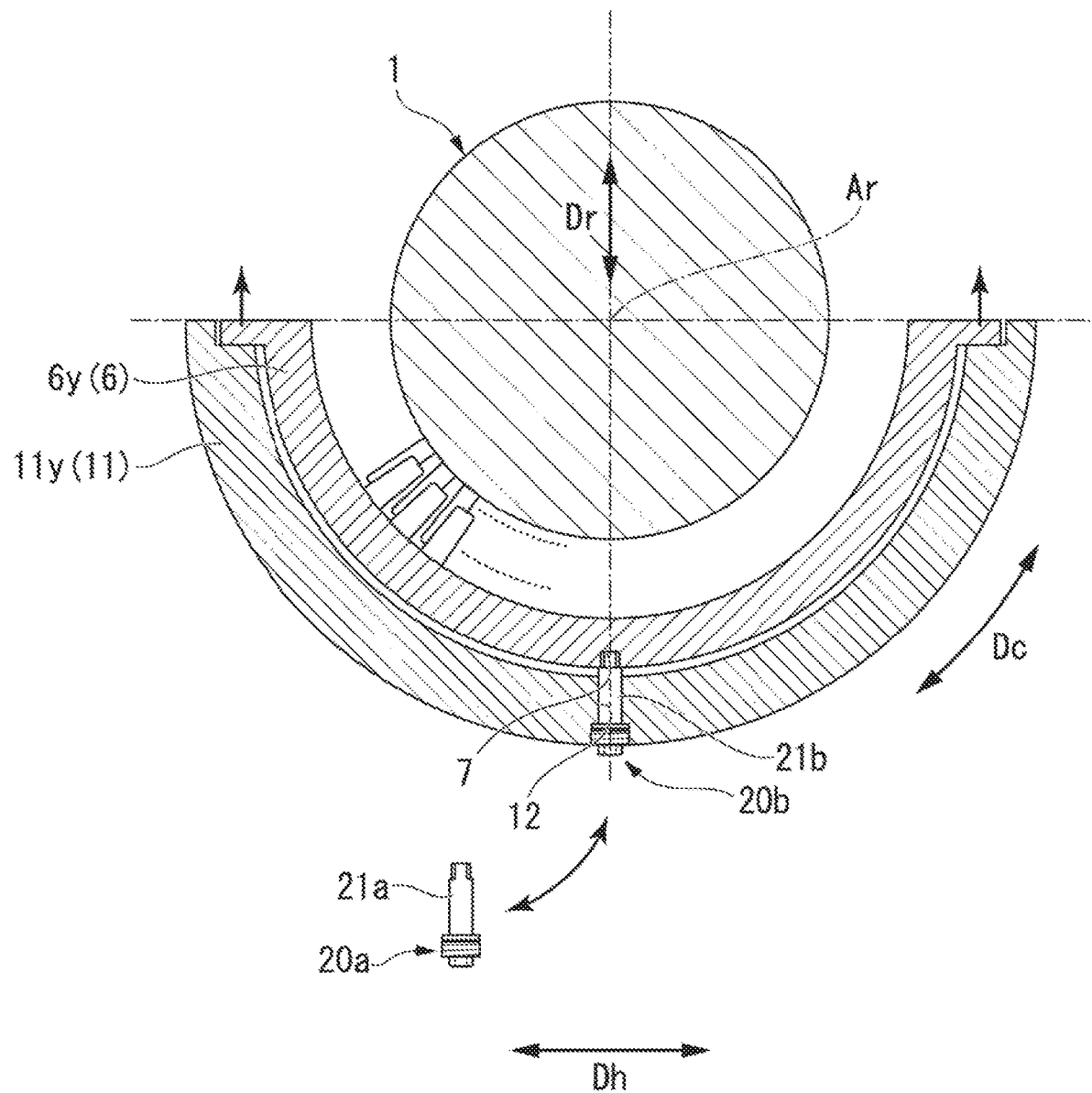
FIG. 17 is an illustrative diagram (part 3) illustrating the positioning method according to the embodiment of the present invention.

Then, the provisional positioning device 20a that provisionally positions the lower half blade ring 6y is removed from the lower half blade ring 6y and the lower half casing 11y, as illustrated in FIG. 17 (S6: provisional positioning release step). The above-described provisional holding step (S5) may be performed after execution of the provisional positioning release step (S6).

Subsequently, the adjusted positioning device 20b in place of the provisional positioning device 20a is attached to the lower half blade ring 6y and the lower half casing 11y (S7: positioning device attachment step), as illustrated in FIG. 17. The adjusted positioning, device 20b is a positioning device 20 including the above-described adjusted pin 21b. In the attachment of the adjusted positioning device 20b, first, the adjusted pin 21b is inserted into the pin insertion holes 12 of the lower half casing 11y and the pin groove 7 of the lower half blade ring 6y. In this case, the sealing member 75 is inserted into the seal groove 32 of the pin 21 in advance.

As described above, the side circumferential, surface 23c obtained by partially extending the outer circumferential surface of the cylindrical insertion portion 22 is formed in the groove insertion portion 23 of the pin 21. Further, the groove contact member 41 is located on the inner side relative to the above-described virtual outer circumferential surface obtained by extending the outer circumferential surface of the cylindrical insertion portion 22, in a state in which the liner 61 and the groove contact member 41 are fixed to the groove insertion portion 23 of the pin 21. Further, the first tapered surface 44a is formed on the distal end side in the groove contact member 41. Therefore, the adjusted pin 21b can be easily inserted into the pin insertion hole 12 of the lower half casing 11y and the pin groove 7 of the lower half blade ring 6y.

Then, as illustrated in FIGS. 2 and 3, the pin pressing screw 81 is screwed into the flange accommodation concave portion 13 that communicates with the pin insertion hole 12 of the lower half casing 11y. When the pin pressing screw 81 is screwed in, the distal end of the pin pressing screw 81 comes in contact with the head flange 31 of the adjusted pin 21b. That is, an opening of the flange accommodation concave portion 13 of the lower half casing 11y is blocked by the pin pressing screw 81 (lid member), and the adjusted pin 21b is prevented from coming out of the pin insertion hole 12 by the pin pressing screw 81. Then, the loosening stop tool 85 is attached to the pin pressing screw 81. In the attachment of the loosening stop tool 85, the loosening stop screw 86 is screwed into loosening stop hole 15 of the half casing 11. The screw head portion 87 of the loosening stop screw 86 and the screw head portion 83 of the pin pressing screw 81 are connected by the wire 88 to restrict the rotation in a loosening direction of the pin pressing screw 81.

The provisional holding of the lower half casing 11y using a crane or the like is released (S8: provisional holding release step).

Thus, the positioning of the lower half blade ring 6y in the horizontal direction Dh with respect to the lower half casing 11y is completed.

The adjusted pin assembly step (S6) is executed after the deviation measurement step (S3) and before the provisional holding step for the lower half blade ring 6y (S5). However, the adjusted pin assembly step (S6) may be executed at any time as long as the process is after the deviation measurement step (S3) and before the positioning device attachment step (S7). The above describes that immediately after the adjusted pin 21b and the pin pressing screw 81 are attached, the attachment of the loosening stop tool 85 is executed. However, the attachment of the loosening stop tool 85 may be performed after basic assembly of the steam turbine is completed.

Although the method of positioning the lower half blade ring by 6y with respect to the lower half casing 11y has been described above, positioning of the upper half blade ring 6x with respect to the upper half casing 11x is also basically the same as the procedure of the above positioning method. However, in this case, the rotor arrangement step (S2) described above is not executed. Specifically, first, the upper half casing 11x is provisionally fixed so that the inner surface is directed upward, and the upper half blade ring 6x is provisionally positioned with respect to the upper half casing 11x using the provisional positioning device 29a (St: provisional positioning step). Then, the deviation amount in the horizontal direction Dh of the upper half blade ring 6x with respect to the upper half casing 11x is measured (S3: deviation measurement step). Subsequently, the adjusted pin assembly step (S4) and the like are executed, similarly to the method of positioning the lower half blade ring 6y with respect to the lower half casing 11y. Thereafter the provisional positioning device 21k is removed and the upper half blade ring 6x is removed from the upper half casing 11x. The upper half blade ring 6x, the upper half casing 11x, and the adjusted positioning device 20b are assembled with the lower half blade ring 6y and the lower half casing 11y.

As described above, in the embodiment, the portion 36 of the pin 21 is plastically deformed so as to enter the position restriction concave portion 55 of the groove contact member 41 as the claw portion 37 and come into contact with this position restriction concave portion 55. Thus, the relative movement of the groove contact member 41 with respect to the pin 21 is restricted. Therefore, in the positioning device 20 of the embodiment, bolts or the like for fixing the member in contact with the groove side surface 8 of the pin groove 7 to the pin 21 are unnecessary, and the number of components can be reduced.

The support surface 24 of the pin 21 receives a force in the horizontal direction Dh from the half blade ring 6 via the supported surface 43 of the groove contact member 41. Therefore, it is preferable for an area of the support surface 24 and an area of the supported surface 43 to be large in order to withstand a force applied from the half blade ring 6. In the embodiment, it is not necessary to form a bolt hole into which a bolt is inserted in the support surface 24 of the pin 21 and the supported surface 43 of the groove contact member 41. Therefore, in the positioning device 20 of the embodiment, it is possible to increase the areas of the surfaces 24 and 43 without changing a width or the like of the support surface 24 of the pin 21 and the supported surface 43 of the groove contact member 41, in contrast with a case in which the bolt hole is formed.

In the embodiment, since the liner 61 is sandwiched between the groove contact member 41 and the groove insertion portion 23 of the pin 21, contact between the liner 61 and steam can be suppressed and corrosion of the liner 61 can be suppressed.

In the embodiment, the first engaging concave portion 25 and the second engaging concave portion 26 are formed in the groove insertion portion 23 of the pin 21, and the first engaged convex portion 45 and the second engaged convex portion 46 are formed in the groove contact member 41. Thus, it is possible to attach the groove contact member 41 to a predetermined position in the pin 21 easily and accurately. Further, in the embodiment, the pair of first engaging concave portions 25 are formed in the groove insertion portion 23 of the pin 21 with an interval therebetween so as to be long in the pin axis direction Dp, and the pair of first engaged convex portions 45 entering the pair of first engaging concave portions 25 are formed in the groove contact member 41 with an interval therebetween so as to be long in the pin axis direction Dp. The liner 61 is arranged between the pair of first engaging concave portions 25 and the pair of first engaged convex portions 45. Therefore, in the embodiment, it is possible to suppress the contact of the steam from both sides in the width direction of the liner 61.

If the pin 21 is pulled from the pin groove 7 in a state in which a wall surface of the pin groove 7 and the groove contact member 41 stick to each other, there is a likelihood of the claw portion 37 of the pin 21 or the like being damaged and the groove contact member 41 being retained in the pin groove 7. In the embodiment, since the second engaging concave portion 26 and the second engaged convex portion 46 are both formed so as to be long in a direction perpendicular to the pin axis direction Dp, the groove contact member 41 is moved in the pin axis direction Dp together with the pin 21 when the pin 21 is moved in the pin axis direction Dp. Therefore, in the embodiment, when the pin 21 is removed from the pin groove 7 and the pin insertion hole 12, it is possible to reduce the likelihood of retention of the groove contact member 41 in the pin groove 7.

In the embodiment since the sealing member 75 is arranged between the head flange 31 of the pin 21 and a bottom surface of the flange accommodation concave portion 13 of the half casing 11, it is possible to prevent steam in the casing 10 from flowing out to the outside through the pin insertion hole 12 of the casing 10.

In the embodiment, the deformation assistance concave portion 35 is formed adjacent to the portion 36 to be plastically deformed in the pin 21. Therefore, in the embodiment, when the portion 36 of the pin 21 is plastically deformed using the tool T such as a punch, the tool T such as a punch can be easily applied to a position adjacent to the portion 36 of the pin 21, and the portion 36 of the pin 21 can be easily plastically deformed. Thus, since the deformation assistance concave portion 35 is intended to allow easy plastic deformation of the portion 36 of the pin 21 using the tool T such as a punch, the deformation assistance concave portion 35 is not essential.

In the embodiment, since the concave surface defining the deformation assistance concave portion 35 forms a portion of the outer circumferential surface of the virtual cylinder Cv, the tool T such as a cylindrical or conical punch can be easily placed along the concave surface. Further, in the embodiment, since the concave surface defining the position restriction concave portion 55 forms a portion of the outer circumferential surface of a virtual cylinder, the claw portion 37 of the pin 21 is easily brought into close contact over a wide range of the concave surface, and a direction of position restriction of the groove contact member 41 by the claw portion 37 of the pin 21 can be set to various directions.

In the embodiment, since the pin pressing screw 81 is screwed into the flange accommodation concave portion 13 that communicates with the pin insertion hole 12, it is possible to prevent the pin 21 from dropping from the pin insertion hole 12. Further, in the embodiment, when the pin 21 inserted into the pin insertion hole 12 is removed, the pin pressing screw 81 is loosened and removed, making it possible to simply remove the pin 21. Further, in the embodiment, since the loosening of the pin pressing screw 81 can be restricted by the loosening stop tool 85, it is possible to prevent the pin 21 from dropping due to the dropping of the pin pressing screw 81. The head of the pin 21 or the screw portion 82 of the pin pressing screw 81 may be caulked in the half casing 11 using a punch or the like.

[Modification Examples of Claw Portion and Position Restriction Concave Portion]

Next, various modification examples of the claw portion and the position restriction concave portion in the positioning device described above will be described.

The position restriction concave portion 55 in the embodiment is formed in a region including a corner between the convex inner surface 48a of the first engaged convex portion 45 and the distal end surface 47 in the groove contact member 41. Further, the claw portion 37 in the above embodiment is obtained by deforming the portion 36 facing the position restriction concave portion 55 in the pin 21. However, the position restriction concave portion and the claw portion may be formed in another region.

Figure 20:
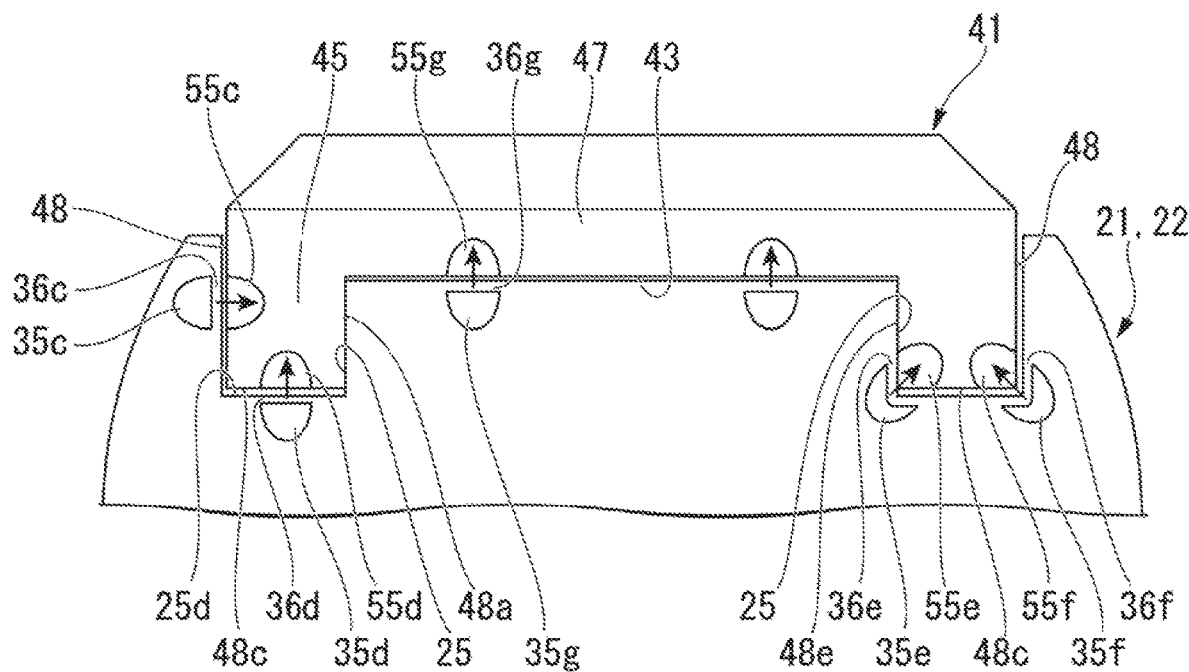
FIG. 20 is a plan view of main portions of a positioning device in a modification example of the embodiment according to the present invention.

Specifically, as illustrated in FIG. 20, a position restriction concave portion 55c may be formed in a region including the corner between the side surface 48 and the distal end surface 47 of the groove contact member 41. In this case, a portion 36c facing the position restriction concave portion 55c in the pin 21 is plastically deformed so that the portion 36c becomes a claw portion. A deformation assistance concave portion 35c may be formed on the side opposite to the position restriction concave portion 55c with reference to the portion 36c.

Further, a position restriction concave portion 55d may be formed in a region including a corner between a projection surface 48c of the first engaged convex portion 45 and the distal end surface 47 in the groove contact member 41. The projection surface 48c of the first engaged convex portion 45 is a surface facing a concave bottom surface 25d of the first engaging concave portion 25 of the pin 21. In this case, a portion 36d facing the position restriction concave portion 55d in the pin 21 is plastically deformed so that the portion 36d becomes a claw portion. Further, a deformation assistance concave portion 35d may be formed on the side opposite to the position restriction concave portion 55d with reference to this portion 36d.

Further, a position restriction concave portion 55e may be formed in a region including a corner between the projection surface 48c of the first engaged convex portion 45, the convex inner surface 48a of the first engaged convex portion 45, and the distal end surface 47 in the groove contact member 41. Further, a position restriction concave portion 55f may be formed in a region including a corner between the projection surface 48c of the first engaged convex portion 45, the side surface 48 of the groove contact member 41, and the distal end surface 47 in the groove contact member 41. In these cases, portions 36e and 36f facing the position restriction concave portions 55e and 55f in the pin 21 are plastically deformed, and the portions 36e and 36f are used as a claw portion. Further, deformation assistance concave portions 35e and 35f may be formed on the side opposite to the position restriction concave portions 55e and 55f with reference to the portions 36e and 36f.

Further, a position restriction concave portion 55g may be formed in a region including the corner between the supported surface 43 and the distal end surface 47 of the groove contact member 41. In this case, a portion 36g that faces the position restriction concave portion 55g in the pin 21 is plastically deformed, and this portion 36g is used as a claw portion. Further, a deformation assistance concave portion 35g may be formed on the side opposite to the position restriction concave portion 55g with reference to this portion 36g.

Here, the position restriction concave portions 55 and 55c to 55g of the embodiment and the modification examples are all formed in a region including a corner between the facing surface facing the pin 21 and the exposed surface other than the facing surface among the surfaces of the groove contact member 41. However, the position restriction concave portion may not be formed in a region including the corner between the facing surface and the exposed surface of the groove contact member 41.

Figure 21:
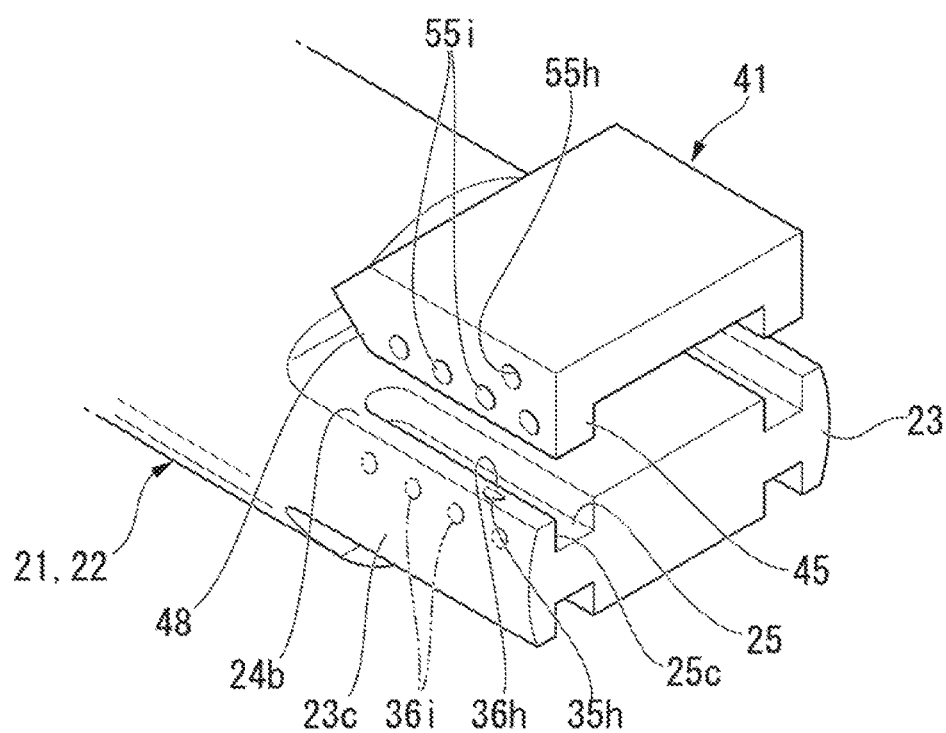
FIG. 21 is a perspective view of main portions of a positioning device according to another modification of the embodiment of the present invention.

More specifically, as illustrated in FIG. 21, a position restriction concave portion 55h may be formed in a region facing the outer surface 24b of the pin 21 in the side surface 48 of the groove contact member 41. In this case, a portion of the outer surface 24b of the pin 21, which is a portion 36h facing the position restriction concave portion 55h in the pin 21, is plastically deformed and this portion 36h is used as a claw portion. Further, a deformation assistance concave portion 35h may be formed on the side opposite to the position restriction concave portion 55h with reference to this portion 36h.

Further, a position restriction concave portion 55i may be formed in a region facing a concave side surface 25c defining the first engaging concave portion 25 in the pin 21 in the side surface 48 of the groove contact member 41. In this case, a portion of the side circumferential surface 23c of the groove insertion portion 23 of the pin 21, which is a portion 36i facing the position restriction concave portion 55i in the pin 21, is plastically deformed and the portion 36i is used as the claw portion. In this case, if the first engaged convex portion 45 of the groove contact member 41 is inserted into the first engaging concave portion 25 of the pin 21, the position restriction concave portion 55i of the pin 21 cannot be visually seen. Therefore, it is preferable for some mark to be added to the portion 36i facing the position restriction concave portion 55i in the pin 21.

There may be a plurality of sets of position restriction concave portions 55 and 55c to 55i and the claw portion in the above embodiment and each modification example. Further, in a case in which a plurality of sets are provided, a set shown in one modification example or the like among the embodiment and the modification examples described above and a set shown in another modification example may be combined.

The position restriction concave portions 55 and 55c to 55i in the embodiment and the modification examples are all formed on the groove contact member 41 side. Further, the claw portion in the embodiment and each modification example is obtained by plastically deforming a portion of the pin 21. However, a position restriction concave portion may be formed on the pin 21 side, and a portion of the groove contact member 41 may be plastically deformed and used as the claw portion.

Figure 22:
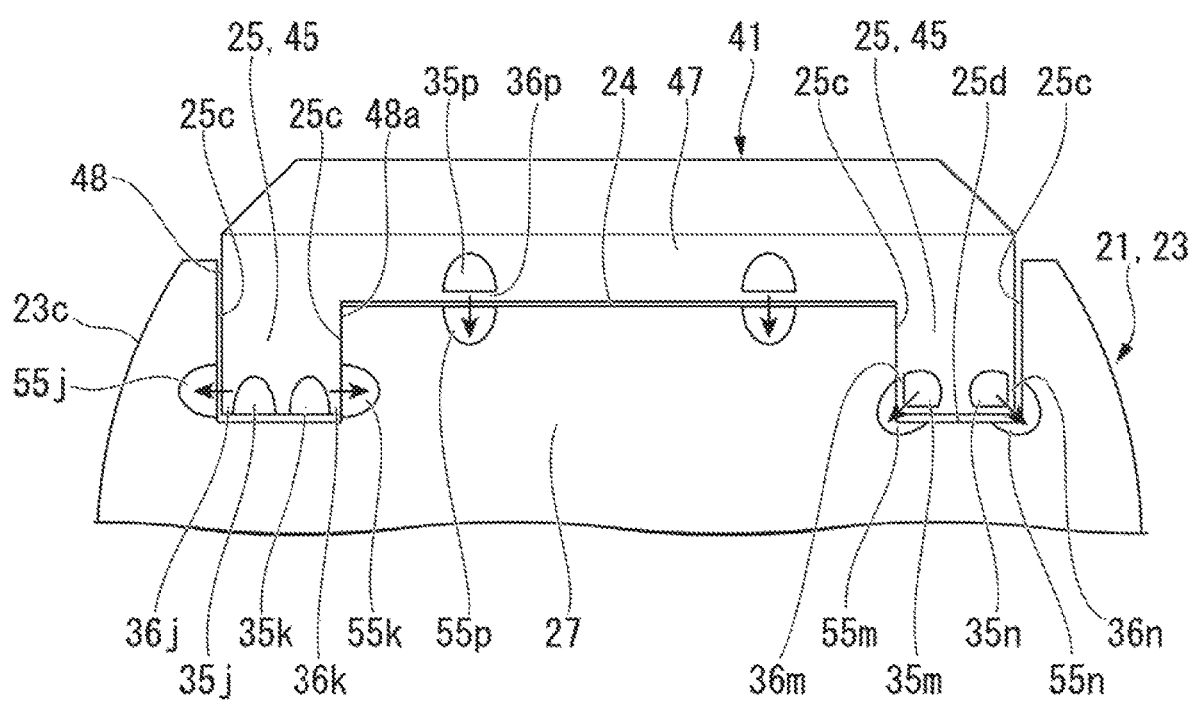
FIG. 22 is a plan view of main portions of a positioning device according to still another modification example of the embodiment of the present invention.

Specifically, as illustrated in FIG. 22, a position restriction concave portion 55j may be formed in a region including a corner between one of a pair of concave side surfaces 25c which defines the first engaging concave portion 25 in the pin 21 and the distal end surface 27 of the pin 21. Here, the one of the concave side surfaces 25c is a concave side surface on the side circumferential surface 23c side in the groove insertion portion 23 of the pair of concave side surfaces 25c which defines the first engaging concave portion 25. In this case, a region including the corner between the side surface 48 of the groove contact member 41 and the distal end surface 47 of the groove contact member 41, which is a portion 36j facing the position restriction concave portion 55j in the groove contact member 41, is plastically deformed and this portion 36j is used as the claw portion. Further, a deformation assistance concave portion 35j may be formed on the side opposite to the position restriction concave portion 55j with reference to this portion 36j.

Further, a position restriction concave portion 55k may be formed in a region including a corner between the other of the pair of concave side surfaces 25c which defines the first engaging concave portion 25 in the pin 21 and the distal end surface 27 of the pin 21. In this case, a region including a corner between the convex inner surface 48a of the first engaged convex portion 45 in the groove contact member 41 and the distal end surface 47 of the groove contact member 41, which is a portion 36k facing the position restriction concave portion 55k in the groove contact member 41, is plastically deformed and this portion 36k is used as the claw portion. A deformation assistance concave portion 35k may be formed on the side opposite to the position restriction concave portion 55k with reference to this portion 36k.

Further, a position restriction concave portion 55m may be formed in a region including a corner between the concave bottom surface 25d defining the first engaging concave portion 25 in the pin 21, the other concave side surface 25c, and the distal end surface 27 of the pin 21. Further, a position restriction concave portion 55n may be formed in a region including a corner between the concave bottom surface 25d defining the first engaging concave portion 25 in the pin 21, the one concave side surface 25c, and the distal end surface 27 of the pin 21. In these cases, portions 36m and 36n facing the position restriction concave portions 55m and 55n in the groove contact member 41 are plastically deformed, and the portions 36m and 36n are used as the claw portion. Further, deformation assistance concave portions 35m and 35n may be formed on the side opposite to the position restriction concave portions 55m and 55n with reference to the portions 36m and 36n.

Further, a position restriction concave portion 55p may be formed in a region including the corner between the support surface 24 and the distal end surface 27 of the pin 21. In this case, a portion of the distal end surface 47 of the groove contact member 41, which is a portion 36p facing the position restriction concave portion 55p, is plastically deformed, and this portion 36p is used as the claw portion. A deformation assistance concave portion 35p may be formed on the side opposite to the position restriction concave portion 55p with reference to this portion 36p.

There may be a plurality of sets of position restriction concave portions 55j, 55k, 55m, 55n, and 55p and the claw portion in each modification example in which the position restriction concave portion is formed on the pin 21 side. Further, in a case in which a plurality of sets are provided, a set shown in one modification example or the like among the modification examples and a set shown in another modification example may be combined. Further, a set shown in one modification example in which the position restriction concave portion is formed on the pin 21 side and a set shown in one modification example or the embodiment in which the position restriction concave portion is formed on the groove contact member 41 side may be combined.

[First Modification Example of Positioning Method]

Figure 23:
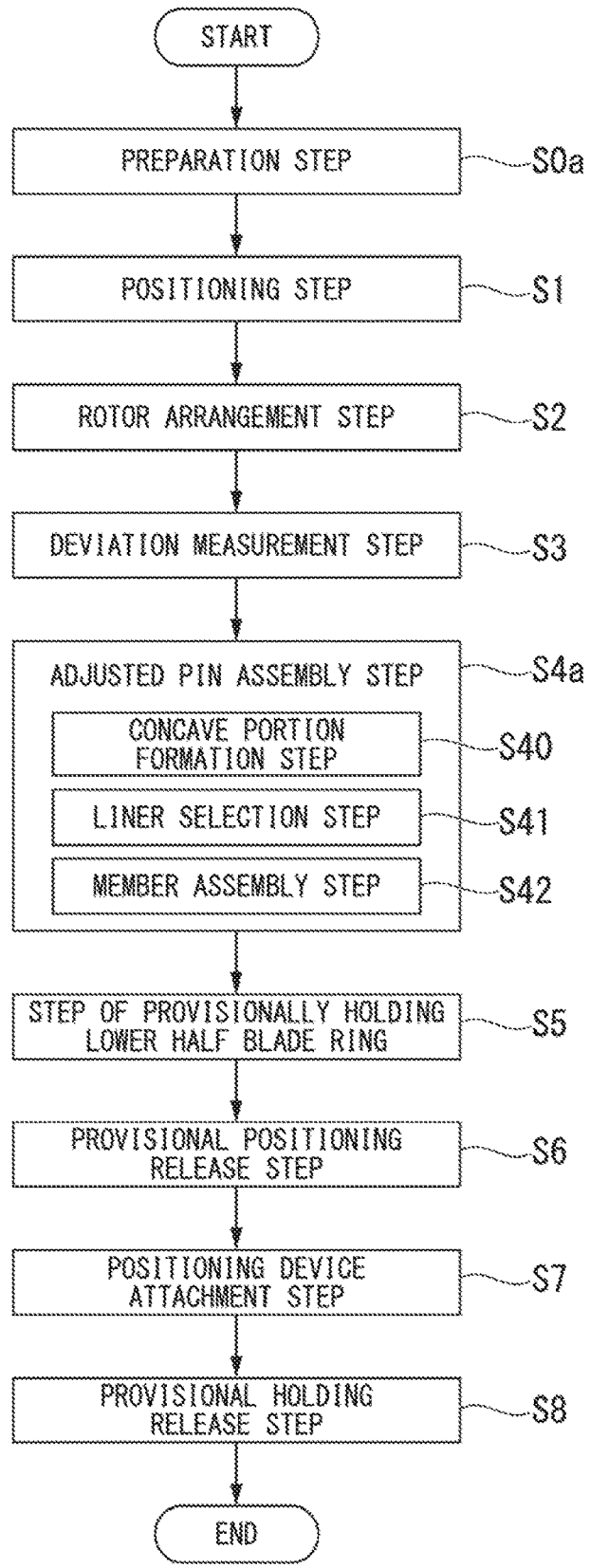
FIG. 23 is a flowchart illustrating a procedure of a positioning method in a first modification example of the embodiment according to the present invention.

A first modification example of the positioning method described above will be described with reference to a flowchart illustrated in FIG. 23.

In the positioning method of this modification example, a preparation step (S0a), the provisional positioning step (S1), the rotor arrangement step (S2), the deviation measurement step (S3), an adjusted pin assembly step (S4a), the step of provisionally holding the lower half blade ring (S5), the provisional positioning release step (S6), the positioning device attachment step (S7), and the provisional holding release step (S8) are executed similarly to the positioning method of the above embodiment. However, the preparation step (S0a) and the adjusted pin assembly step (S4a) in the positioning method of this modification example are different from the preparation step (S0) and the adjusted pin assembly step (S4) in the positioning method of the above embodiment.

In the preparation step (S0a) of this modification example, the pin 21, the liner 61, the groove contact member 41, the sealing member 75, the pin pressing screw 81, and the loosening stop tool 85 constituting the positioning device 20 are prepared. However, the deformation assistance concave portion 35 is not formed in the pin 21 prepared in the preparation step (S0a) of this modification example, and the position restriction concave portion 55 is not formed in the groove contact member 41.

In the adjusted pin assembly step (S4a) of this modification example, first, the deformation assistance concave portion 35 is formed in the pin 21, and the position restriction concave portion 55 is formed in the groove contact member 41 (S40: concave portion formation step). Then, the liner selection step (S41) and the member assembly step (S42) are executed, similarly to the adjusted pin assembly step (S4) in the above embodiment.

Work for forming the deformation assistance concave portion 35 in the pin 21 or work for forming the position restriction concave portion 55 in the groove contact member 41 is work that can be performed relatively easily in an assembly site for a steam turbine or the like. Therefore, as in this modification example, in the preparation step (S0a), the pin 21 having no deformation assistance concave portion 35 formed therein and the groove contact member 41 having no position restriction concave portion 55 formed therein may be prepared, and the concave portions 35 and 55 may be formed in the adjusted pin assembly step (S4a).

Although the liner selection step (S41) is executed after the concave portion formation step (S40) in this modification example, the concave portion formation step (S40) may be executed after the liner selection step (S41). That is, the concave portion formation step (S40) may be performed at an arbitrary stage as long as the concave portion formation step (S40) is before the member assembly step (S42).

Further, this modification example is an example in which the deformation assistance concave portion 35 is formed on the pin 21 side, and the position restriction concave portion 55 is formed on the groove contact member 41 side. However, in this modification example, the deformation assistance concave portion may be formed on the groove contact member 41 side and the position restriction concave portion may be formed on the pin 21 side.

[Second Modification Example of Positioning Method]

Figure 24:
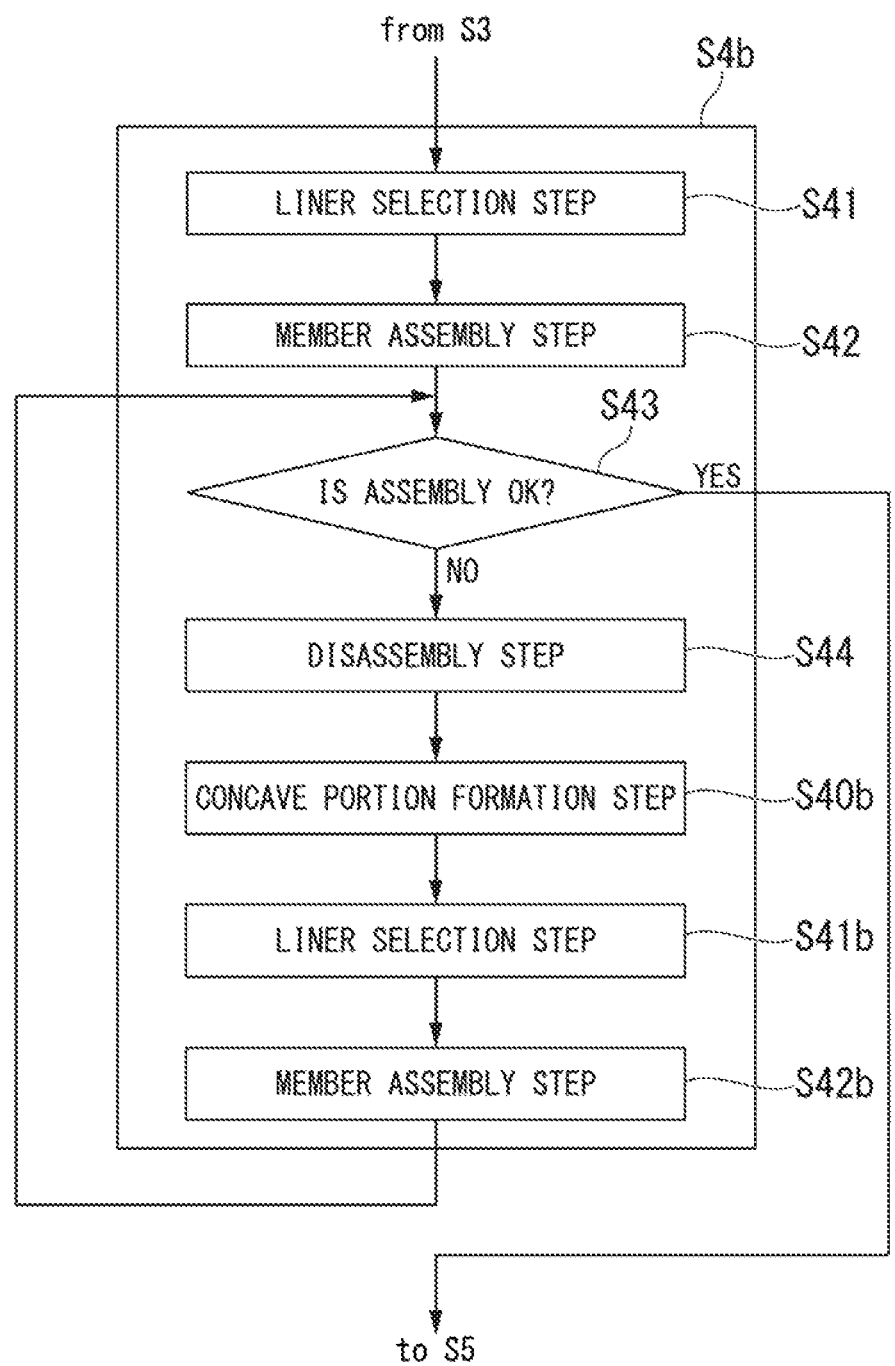
FIG. 24 is a flowchart illustrating a detailed procedure of an adjusted pin assembly step of a positioning method in a second modification example of the embodiment according to the present invention.

A second modification example of the positioning method described above will be described with reference to a flowchart illustrated in FIG. 24.

The positioning method in this modification example is a modification of the adjusted pin assembly step (S4) in the positioning method of the above embodiment, and the other steps are the same as in the positioning method of the above embodiment.

In an adjusted pin assembly step (S4b) of this modification example, the liner selection step (S41) and the member assembly step (S42) are executed, similarly to the adjusted pin assembly step (S4) of the above embodiment.

In the adjusted pin assembly step (S4b) of this modification example, thereafter, assembly confirmation of whether the liner 61 and the groove contact member 41 are firmly attached to the pin 21 and whether an interval between the groove contact surfaces 42 of the pair of groove contact members 41 is an appropriate size is performed (S43: assembly confirmation step). If it is confirmed in this assembly confirmation step (S43) that the assembly is OK, the process proceeds to the step of provisionally holding the lower half blade ring (S5).

On the other hand, if it is not confirmed in this assembly confirmation step (S43) that the assembly is OK, the adjusted pin 21b assembled in the member assembly step (S42) is disassembled (S44: disassembly step). In the disassembly of the adjusted pin 21b, the claw portion 37 formed through plastic deformation is cut using a tool such as a punch or a chisel, and the groove contact member 41 is separated from the pin 21.

After the disassembly step (S44), a position restriction concave portion 55 is formed at a position different from the position restriction concave portion 55 formed previously in the groove contact member 41, and a new deformation assistance concave portion 35 is formed at a position adjacent to the position restriction concave portion 55 newly formed in the pin 21 (S40b: concave portion formation step). Then, after a liner selection step (S41b) is executed as necessary, a member assembly step (S42b) is executed. In this member assembly step (S42b), a portion facing the position restriction concave portion 55 newly formed in the groove contact member 41 is plastically deformed, and this portion is inserted, as a claw portion, into the position restriction concave portion 55 newly formed in the pin 21.

After this member assembly step (S42b), the assembly confirmation step (S43) is executed again, and if it is confirmed in the assembly confirmation step (S43) that the assembly is OK, the process proceeds to the step of provisionally holding the lower half blade ring (S5).

Although the liner selection step (S41b) is executed after the concave portion formation step (S40b) in this modification example, the concave portion formation step (S40b) may be performed after the liner selection step (S41b). That is, the concave portion formation step (S40b) may be performed at an arbitrary stage as long as the concave portion formation step (S40b) is before the member assembly step (S42b). Further, if the groove contact member 41 having the spare position restriction concave portion 55 formed therein and the pin 21 having the spare deformation assistance concave portion 35 formed therein are prepared in the preparation step (S0), it is not necessary to execute the concave portion formation step (S40b) in the adjusted pin assembly step (S4b).

Further, this modification example is an example in which the deformation assistance concave portion 35 is formed on the pin 21 side, and the position restriction concave portion 55 is formed on the groove contact member 41 side. However, in this modification example, the deformation assistance concave portion may be formed on the groove contact member 41 side, and the position restriction concave portion may be formed on the pin 21 side.

[Third Modification Example of Positioning Method]

Figure 25:
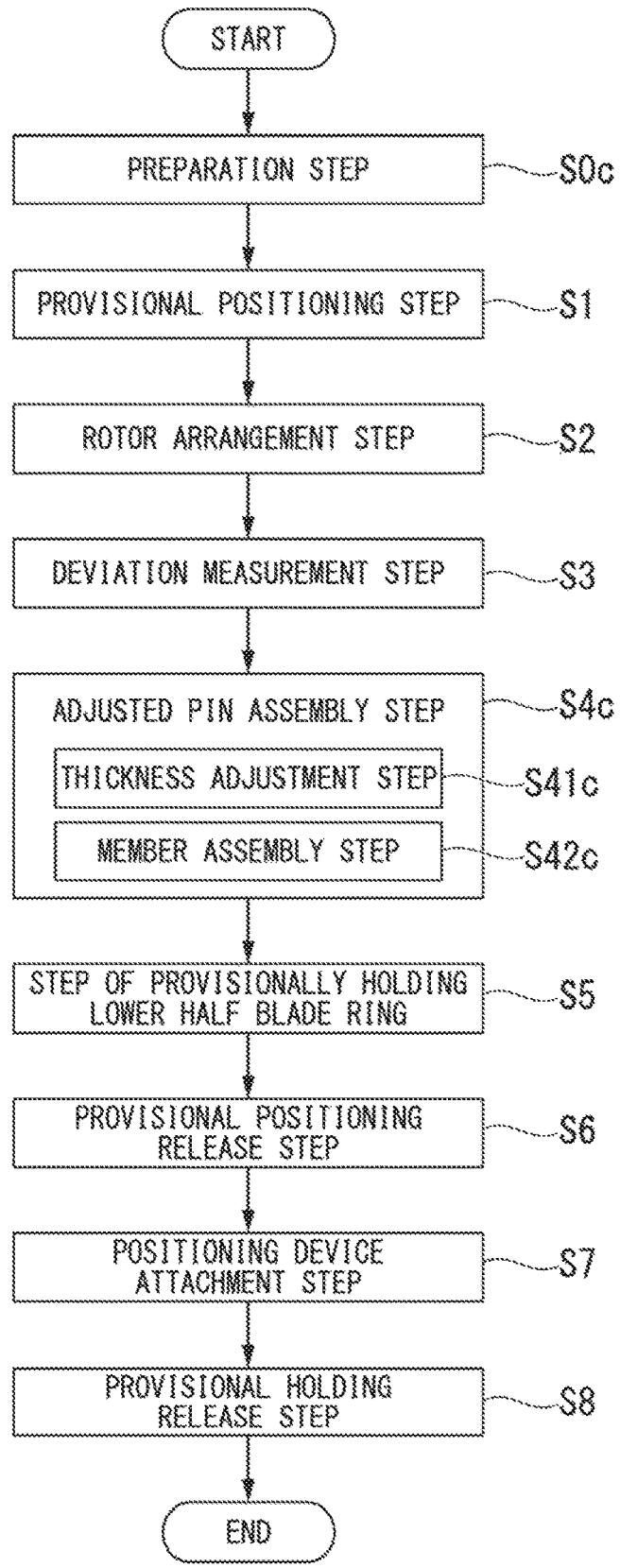
FIG. 25 is a flowchart illustrating a procedure of a positioning method in a third modification example of the embodiment according to the present invention.

A third modification example of the positioning method described above will be described with reference to a flowchart illustrated in FIG. 25.

In the positioning method of this modification example, a preparation step (S0c), the provisional positioning step (S1), the rotor arrangement step (S2), the deviation measurement step (S3), an adjusted pin assembly step (S4c), the step of provisionally holding the lower half blade line (S5), the provisional positioning release step (S6) the positioning device attachment step (S7), and the provisional holding release step (S8) are executed, similarly to the positioning method in the above embodiment. However, the preparation step (S0c) and the adjusted pin assembly step (S4c) in the positioning method of this modification example are different from the preparation step (S0) and the adjusted pin assembly step (S4) in the positioning method of the above embodiment.

In the preparation step (S0c) of this, modification example, the groove contact member 41, the sealing member 75, the pin pressing screw 81, and the loosening stop tool 85 are prepared. On the other hand, in the preparation step (S0c) of this modification example, the liner 61 is not prepared.

In the adjusted pin assembly step (S4c) of this modification example, the thickness of the groove contact member 41 is adjusted to a thickness according to the deviation amount measured in the deviation measurement step (S3) (S41c: thickness adjustment step). Here, the thickness of the groove contact member 41 is an interval between the groove contact surface 42 and the supported surface 43 of the groove contact member 41. In the thickness adjustment step (S41c), basically, the thickness is adjusted by cutting the groove contact surface 42 of the groove contact member 41. Therefore, the thickness of the groove contact member 41 prepared in the preparation step (S0c) is greater than the thickness of the groove contact member 41 for which the use of the liner 61 is assumed.

In the adjusted pin assembly step (S4c), after the thickness adjustment step (S41c), a member assembly step (S42c) is executed. In this member assembly step (S42c), the groove contact member 41 is attached to the pin 21 without arranging the liner 61 between the groove insertion portion 23 of the pin 21 and the groove contact member 41. Thus, the adjusted pin assembly step (S4c) is completed.

In the embodiment and each modification example, the groove contact member 41 is used as a liner presser that presses the liner 61. However, in this modification, example, the groove contact member 41 is used as a liner. If the groove contact member 41 is used as a liner as in this modification example, it is possible to further reduce the number of components of the positioning device. However, when the groove contact member 41 is used as a liner, it is necessary to execute the thickness adjustment step (S41c) at a site or the like at which the steam turbine is assembled, which increases time and effort taken at the site. Therefore, it is preferable to determine whether to use the groove contact member 41 as the liner presser or as a liner by comparing a reduction in the number of components with an increase in time and effort on the site.

Even when the groove contact member 41 is used as a liner as in this modification example, the concave portion formation step (S40) may be performed in the adjusted pin assembly step as in the first modification example. Further, even when the groove contact member 41 is used as a liner, the assembly confirmation step (S43), the subsequent disassembly step (S44), or the like may be performed in the adjusted pin assembly step, as in the second modification example. However, in this case, the liner selection step (S41 and S41b) in the adjusted pin assembly step in the second modification example is replaced with the thickness adjustment step. Further, in this modification example, the deformation assistance concave portion may be formed on the groove contact member 41 side and the position restriction concave portion may be formed on the pin 21 side.

[Other Modification Examples]

In the above embodiment, the engaging portions (the first engaging concave portion 25 and the second engaging concave portion 26) of the pin 21 are concave portions, and the engaged portions (the first engaged convex portion 45 and the second engaged convex portion 46) of the groove contact member 41 are convex portions. However, conversely, the engaging portions of the pin 21 may be convex portions, and the engaged portions of the groove contact member 41 may be concave portions.

In the above embodiment, the two first engaging concave portions 25 are formed in the pin 21, and the two first engaged convex portions 45 are formed in the groove contact member 41. However, there may be one first engaging concave portion 25 or there may be no first engaging concave portions. Further, there may be one first engaged convex portion 45 or there may be no first engaged convex portions according to the number of the first engaging concave portions 25. Further, there may be no second engaging concave portion 26 and second engaged convex portion 46 in the above embodiment.

The convex insertion portion 63 of the liner 61 in the embodiment is a hole formed in the liner 61. However, this convex insertion portion 63 need not be a hole as long as the second engaged convex portion 46 of the groove contact member 41 can be inserted. For example, the convex insertion portion 63 may be a notch formed in the liner 61. Further, as described above, when the second engaged convex portion 46 of the groove contact member 41 is omitted, it is not necessary to form the convex insertion portion 63 in the liner 61.

In the above embodiment, the liner 61 is arranged between the first groove contact member 41a and the groove insertion portion 23 of the pin 21 and between the second groove contact member 41b and the groove insertion portion 23 of the pin 21. However, according to the deviation amount in the horizontal direction Dh measured in the above-described deviation measurement step (S3), the liner 61 may be arranged only either between the first groove contact member 41a and the groove insertion portion 23 of the pin 21 or between the second groove contact member 41b and the groove insertion portion 23 of the pin 21.

In the above embodiment, the pin pressing screw 81 is used for preventing the pin 21 from dropping from the pin insertion hole 12. However, the head of the pin 21 may be welded to the half casing 11 instead of using the pin pressing screw 81.

In the above embodiment, the tapered reception surface 20 is formed on the distal end side in the pin 21, and the tapered contact surface 52 is formed on the base end side in the groove contact member 41. The tapered reception surface 29 and the tapered contact surface 52 serve to restrict the relative movement of the groove contact member 41 to the base end side with respect to the pin 21, and restrict the relative movement thereof to the side away from the support surface 24 of the pin 21. However, the tapered reception surface may not be formed in the pin and the tapered contact surface may not be formed in the groove contact member.

Figure 26:
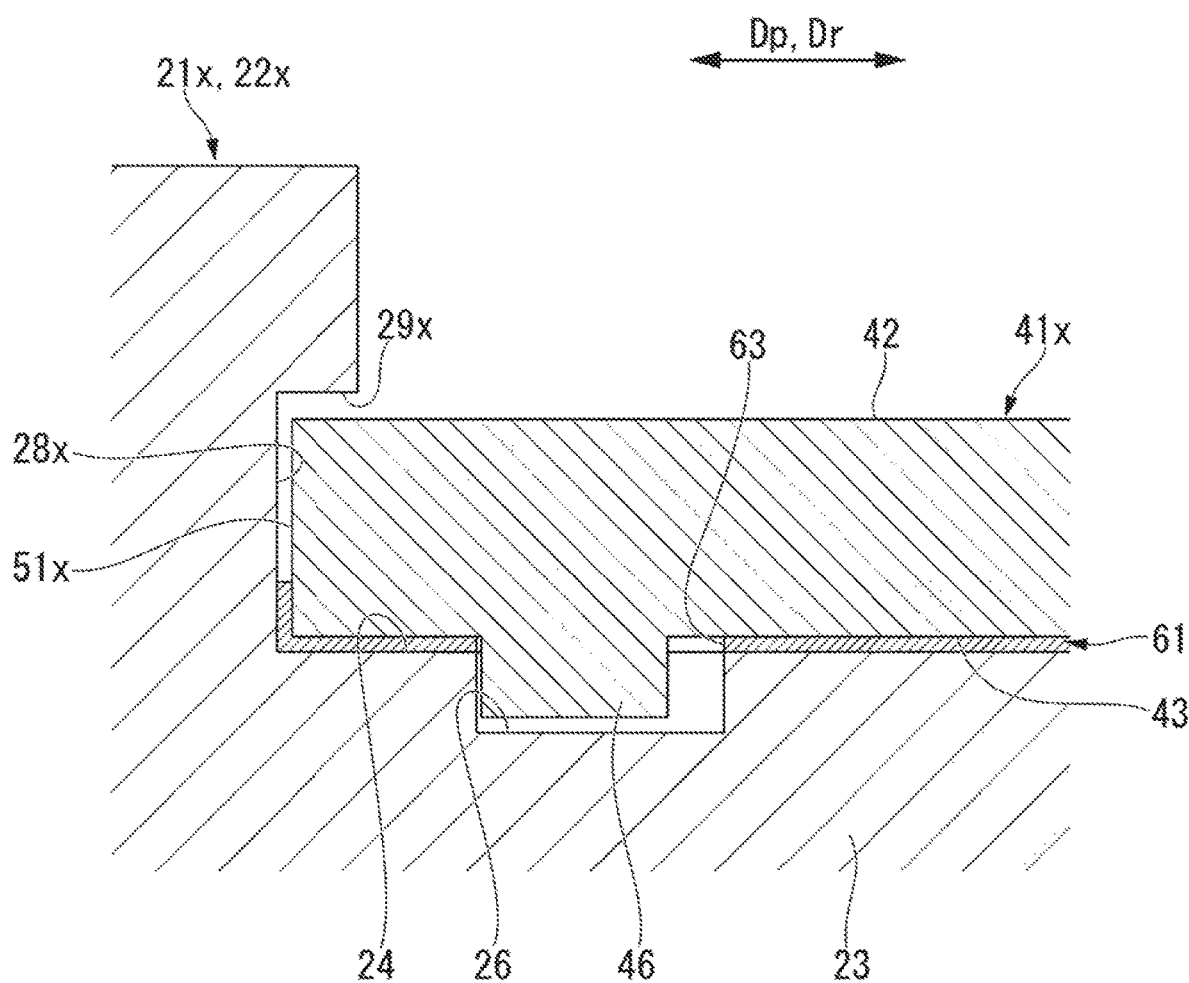
FIG. 26 is a cross-sectional view of main portions of a positioning device in still another modification example of the embodiment according to the present invention.

In this case, for example, a base end surface 51x directed to the base end side and connecting the groove contact surface 42 and the supported surface 43 is formed on the base end side in a groove contact member 41x, as illustrated in FIG. 26. This base end surface 51x may be a surface perpendicular to the groove contact surface 42 and the supported surface 43 of the groove contact member 41x or may be an inclined surface or an uneven surface. On the other hand, an axial movement restriction surface 28x and a separation movement restriction surface 29x are formed on the distal end side in an insertion portion 22x of a pin. 21x. The axial movement restriction surface 28x is a surface directed to the distal end side and facing the base end surface 51x of the groove contact member 41x. The separation movement restriction surface 29x is a surface facing the groove contact surface 42 of the groove contact member 41x and directed toward the groove insertion portion 23 in a direction intersecting the pin axis Ap. An interval between the separation movement restriction surface 29x of the insertion portion 22x in the pin 21x and the support surface 24 of the groove insertion portion 23 in the pin 21x is greater than an interval between the groove contact surface 42 and the supported surface 43 of the groove contact member 41x. As described above, by constituting the groove contact member 41x and the pin 21x, relative movement of the groove contact member 41x to the base end side with respect to the pin 21x can be restricted by a relationship between the base end surface 51x of the groove contact member 41x and the axial movement restriction surface 28x of the pin 21x. Further, relative movement of the groove contact member 41x to a side away from the support surface 24 of the pin 21x can be restricted by a relationship between the groove contact surface 42 of the groove contact member 41x and the separation movement restriction surface 29x of the pin 21x. In this example, the separation movement restriction surface 29x of the pin 21x faces the groove contact surface 42 of the groove contact member 41x. However, when the base end surface 51x of the groove contact member 41x has a convex portion in the axial direction, the separation movement restriction surface 29x of the pin 21x may face the convex portion of the groove contact member 41x.

Figure 27:
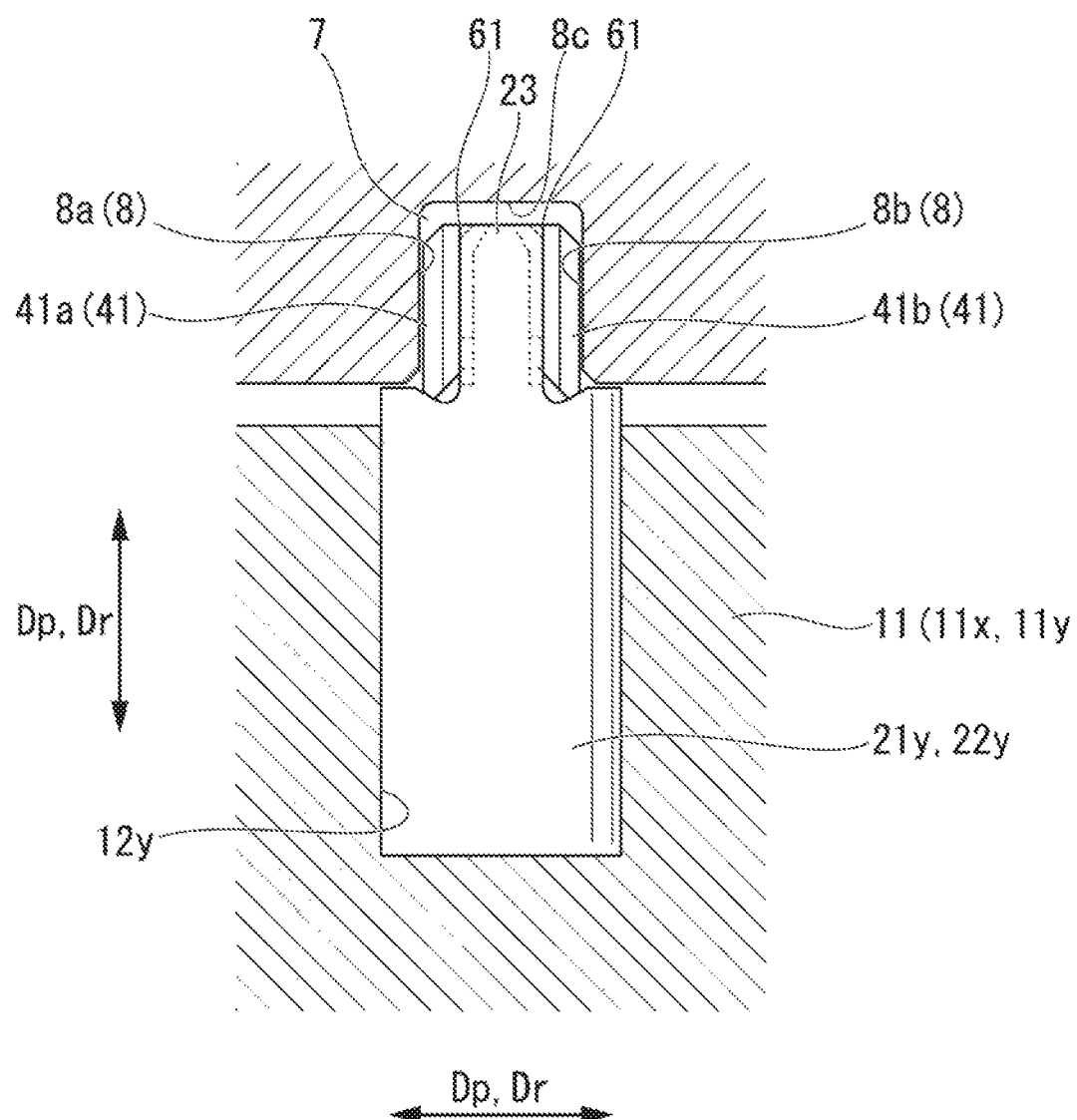
FIG. 27 is an overall side view of a positioning device according to still another modification example of the embodiment of the present invention.

The pin insertion hole 12 formed in the half casing 11 of the above embodiment is a hole penetrating the half casing 11 from the inner circumferential side to the outer circumferential side thereof. However, as illustrated in FIG. 27, a pin insertion hole 12y may not penetrate the half casing 11 as long as the pin insertion hole 12y is recessed from the inner circumferential side to the outer circumferential side of the half casing 11. In this case, a head flange is not formed in an insertion portion 22y of a pin 21y. Further, in this case, a length of the insertion portion 22y in the pin axis direction Dp is equal to or slightly greater than a depth of the pin insertion hole 12y. Thus, if the pin insertion hole 12y does not penetrate the half casing 11, it is not necessary to take into account leakage of fluid from the inner circumferential side to the outer circumferential side of the half casing 11 or dropping of the pin 21y. Thus, when the pin insertion hole 12y does not penetrate the half casing 11, the rotor arrangement step (S2) is performed after the positioning device attachment step (S7) in the positioning methods described in FIGS. 14, 23, and 25. This is because the pin 21y cannot be inserted into the pin insertion hole 12y if the rotor 1 is arranged, as the pin 21y is inserted into the pin insertion hole 12y from the inner circumferential side of the half casing 11.

The positioning device 20 of the above embodiment determines a relative position of the half blade ring 6 serving as an inner member with respect to the half casing 11 serving as an outer member. However, the present invention is not limited thereto, and the outer member need not be the half casing 11 as long as the outer member extends in the circumferential direction Dc around the rotation axis Ar. Further, similarly, the inner member need not be the half blade ring 6 as long as the inner member is arranged on the inner circumferential side of the outer member and extends in the circumferential direction Dc around the rotation axis Ar. Further, the present invention may be applied to other rotary machines such as gas turbines or compressors, in addition to steam turbines.

INDUSTRIAL APPLICABILITY

According to an aspect of the present invention, it is possible to reduce the number of components of the positioning device.

REFERENCE SIGNS LIST

1 Rotor (steam turbine rotor)
2 Rotor shaft
3 Blade
5 Blade ring
6 Half blade ring (inner member)
6x Upper half blade ring (inner member)
6y Lower half blade ring (inner member)
7 Pin groove
8 Groove side surface
8a First groove side surface
8b Second groove side surface
9 Vane
10 Casing
11 Half casing (outer member)
11x Upper half casing (outer member)
11y Lower half casing (outer member)
12 Pin insertion hole
13 Flange reception concave portion
14 Female screw
20 Positioning device
20a Provisional positioning device
20b Adjusted positioning device
21, 21x, 21y Pin
21a Provisional pin
21b Adjusted pin
22, 22x, 22y Insertion portion
23 Groove insertion portion
23c Side circumferential surface
24 Support surface
24a Main support surface
25 First engaging concave portion (engaging portion, first engaging portion)
25a Base end side engaging portion
25b Distal end side engaging portion
26 Second engaging concave portion (engaging portion, second engaging portion.)
27 Distal end surface
28x Axial movement restriction surface
29 Tapered reception surface
29x Separation movement restriction surface
31 Head flange
32 Seal groove
35, 35c, 35d, 35e, 35f, 35g, 35i, 35j, 35k, 35m, 35n, 35p Deformation assistance concave portion
35a First assistance concave portion
35b Second assistance concave portion
36, 36c, 36d, 36e, 36f, 36g, 36h, 36i, 36j, 36k, 36m, 36n, 36p Portion
41 Groove contact member
41a First groove contact member
41b Second groove contact member
42 Groove contact surface
43 Supported surface
44a First tapered surface
44b Second tapered surface
45 first engaged convex portion (engaged portion, first engaged portion)
46 Second engaged convex portion, (engaged portion, second engaged portion)
47 Distal end surface
48 Side surface
48a Convex inner surface
51 Base end surface
52 Tapered contact surface
55, 55c, 55d, 55e, 55f, 55g, 55i, 55j, 55k, 55m, 55n, 55p Position restriction concave portion
61 Liner
61a Prescribed liner
62 Liner body
63 Convex insertion portion
65 Movement restriction portion
75 Sealing member
81 Pin pressing screw (lid member)
82 Screw portion
83 Screw head portion
85 Loosening stop tool

The invention claimed is:

1. A positioning device that positions an inner member arranged on an inner circumferential side of an outer member and extending in a circumferential direction around an axis with respect to the outer member extending in the circumferential direction around the axis, the positioning device comprising:

a pin that enters a pin insertion hole extending from the inner circumferential side to an outer circumferential side of the outer member, and a groove recessed from an outer circumferential side to an inner circumferential side of the inner member; and a groove contact member attached to the pin and coming into contact with a groove side surface of the groove, wherein in one member of the pin and the groove contact member, a position restriction concave portion that is recessed in a direction away from the other member is formed in a portion facing the other member, and a claw portion that enters the position restriction concave portion and comes in contact with the position restriction concave portion is formed in the other member as a portion of the other member is plastically deformed.

2. The positioning device according to claim 1, wherein the pin includes an insertion portion that is inserted into the pin insertion hole of the outer member, and a groove insertion portion that enters the groove of the inner member, the insertion portion forms a columnar shape that is long in a pin axis direction parallel to a pin axis around the pin axis, the groove insertion portion is formed on a distal end side that is one side in the pin axis direction of the insertion portion, a support surface parallel to the pin axis is formed in the groove insertion portion, and a supported surface facing the support surface of the groove insertion portion is formed in the groove contact member.

3. The positioning device according to claim 2, wherein a tapered reception surface facing a side of the support surface and gradually extending toward the distal end side as the tapered reception surface extends away from the support surface is formed on the distal end side in the insertion portion, and a tapered contact surface that comes into surface contact with the tapered reception surface of the insertion portion is formed in the groove contact member.

4. The positioning device according to claim 2, wherein a facing surface facing a surface of the groove contact member among surfaces of the groove insertion portion, an exposed surface other than the facing surface among the surfaces of the groove insertion portion, and a corner between the facing surface and the exposed surface are formed in the groove insertion portion, and a facing surface facing a surface of the pin among surfaces of the groove contact member, an exposed surface other than the facing surface among the surfaces of the groove contact member, and a corner between the facing surface of the groove contact member and the exposed surface of the groove contact member are formed in the groove contact member, and the position restriction concave portion is formed in a region including the corner of the one member.

5. The positioning device according to claim 4, wherein the exposed surface of the groove insertion portion includes a distal end surface that is formed on the distal end side of the groove insertion portion and is directed to the distal end side, the exposed surface of the groove contact member includes a distal end surface that is formed on the distal end side of the groove contact member and is directed to the distal end side, and the position restriction concave portion is formed in a region including a corner between the distal end surface and the facing surface of the one member.

6. The positioning device according to claim 4, wherein a concave surface defining the position restriction concave portion forms a portion of an outer circumferential surface of a virtual cylinder centered on a virtual axis that is inclined with respect to both of the facing surface and the exposed surface of the one member.

7. The positioning device according to claim 2, wherein a first engaged portion that is formed on the distal end side of the groove contact member, extends from the distal end surface directed to the distal end side to a base end side opposite to the distal end side, and has a convex shape with respect to the supported surface is formed in the groove contact member, a first engaging portion that is formed on the distal end side of the groove insertion portion, extends from the distal end surface directed to the distal end side to the base end side, and has a concave shape with respect to the support surface is formed in the groove insertion portion, the first engaged portion includes a base end side engaged portion of which the amount of projection with respect to the supported surface is a predetermined amount of projection, and a distal end side engaged portion that is arranged on the distal end side relative to the base end side engaged portion and of which the amount of projection with respect to the supported surface is larger than the predetermined amount of projection, the first engaging portion includes a base end side engaging portion of which the amount of recess with respect to the support surface is a predetermined amount of recess that allows the base end side engaged portion to enter the base end side engaging portion, and a distal end side engaging portion that is arranged on the distal end side relative to the base end side engaging portion and of which the amount of recess with respect to the support surface is an amount of recess that allows the distal end side engaged portion to enter the distal end side engaging portion, and the position restriction concave portion is formed in one of a region including the distal end surface and the distal end side engaging portion of the groove insertion portion, and a region including the distal end surface and the distal end side engaged portion of the groove contact member.

8. The positioning device according to claim 2, wherein an engaging portion that forms a convex shape or a concave shape with respect to the support surface is formed in the groove insertion portion, and an engaged portion that forms a concave shape or a convex shape with respect to the supported surface and is engaged with the engaging portion is formed in the groove contact member.

9. The positioning device according to claim 8, wherein the engaging portion of the groove insertion portion includes at least one of a first engaging portion that is long in the pin axis direction and a second engaging portion that is long in a direction parallel to the support surface and perpendicular to the pin axis, and the engaged portion of the groove contact member includes at least one of a first engaged portion which is long in the pin axis direction and with which the first engaging portion is engaged, and a second engaged portion which is long in a direction parallel to the supported surface and perpendicular to the pin axis and with which the second engaging portion is engaged.

10. The positioning device according to claim 2, comprising a liner arranged between the groove contact member and the pin in the groove, wherein in the groove contact member, a base end surface adjacent to the supported surface and directed to the base end side is formed on the base end side opposite to the distal end side of the supported surface, and the liner includes a liner body that is in contact with at least one of the supported surface and the support surface, and a movement restriction portion that is bent with respect to the liner body and faces the base end surface.

11. The positioning device according to claim 2,
wherein a concave portion that communicates with the pin insertion hole, has a diameter larger than the pin insertion hole, and is recessed toward the inner circumferential side from the outer circumferential side is formed on the outer circumferential side of the outer member, and
the positioning device comprises a sealing member that is arranged in the concave portion and prevents fluid present on the inner circumferential side of the outer member from flowing out to the outer circumferential side.

12. The positioning device according to claim 2,
wherein the pin insertion hole of the outer member is a cylindrical hole,
the insertion portion of the pin forms a cylindrical shape such that it is insertable into the pin insertion hole,
the groove insertion portion includes a side circumferential surface that is a circumferential surface obtained by extending a portion of an outer circumferential surface of the insertion portion in a cylindrical shape, and a surface that is arranged on an inner side relative to a virtual outer circumferential surface obtained by extending the outer circumferential surface of the insertion portion, the groove contact member being attached to the surface, and
the groove contact member is located on the inner side relative to the virtual outer circumferential surface when the groove contact member is attached to the groove insertion portion.

13. The positioning device according to claim 1, comprising a liner arranged between the groove contact member and the pin in the groove.

14. The positioning device according to claim 1,
wherein a concave portion that communicates with the pin insertion hole and is recessed toward the inner circumferential side from the outer circumferential side is formed on the outer circumferential side of the outer member, and
the positioning device comprises a lid member that closes an opening of the concave portion of the outer member.

15. The positioning device according to claim 1,
wherein a plurality of position restriction concave portions are formed in the one member of the pin and the groove contact member.

16. The positioning device according to claim 1,
wherein a deformation assistance concave portion is formed on the side opposite to the position restriction concave portion of the one member with reference to the claw portion in the other member.

17. A rotary machine, comprising:
the positioning device according to claim 1;
the outer member;
the inner member; and
a rotor that is arranged on the inner circumferential side of the inner member and rotates around the axis.

18. The rotary machine according to claim 17,
wherein the rotor is a steam turbine rotor.

19. A positioning method of positioning an inner member arranged on an inner circumferential side of an outer member and extending in a circumferential direction around an axis with respect to the outer member extending in the circumferential direction around the axis, the positioning method comprising:
a preparation step of preparing a positioning device including a pin that enters a pin insertion hole extending from the inner circumferential side to an outer circumferential side of the outer member and a groove recessed from an outer circumferential side to an inner circumferential side of the inner member, and a groove contact member coming into contact with a groove side surface of the groove;
an adjusted pin assembly step of assembling an adjusted pin obtained by assembling the groove contact member to the pin; and
a positioning device attachment step of inserting the adjusted pin into the pin insertion hole of the outer member and the groove of the inner member,
wherein in one member of the pin and the groove contact member to be prepared in the preparation step, a position restriction concave portion that is recessed in a direction away from the other member is formed in a portion facing the other member, and
the adjusted pin assembly step includes a member assembly step of placing the groove contact member so as to face the pin and plastically deforming a portion of the other member as a claw portion so as to enter the position restriction concave portion and come into contact with the position restriction concave portion.

20. The positioning method according to claim 19,
wherein the adjusted pin assembly step includes a concave portion formation step of forming the position restriction concave portion in the one member, and
in the member assembly step, the groove contact member is placed so as to face the pin, and a portion of the other member is plastically deformed as a claw portion so as to enter one of the position restriction concave portion already formed before the adjusted pin assembly step and the position restriction concave portion formed in the concave portion formation step.

21. The positioning method according to claim 19,
wherein a plurality of liners are prepared in the preparation step,
the adjusted pin assembly step includes a liner selection step of selecting any one of the plurality of liners, and
in the member assembly step, the liner selected in the liner selection step is arranged between the pin and the groove contact member, the groove contact member is placed so as to face the pin with the liner therebetween, and a portion of the groove contact member is plastically deformed so as to enter, as a claw portion, the position restriction concave portion.

22. The positioning method according to claim 19,
wherein the adjusted pin assembly step includes a thickness adjustment step of adjusting a thickness of the groove contact member, and
the member assembly step is executed after the thickness adjustment step.

23. A positioning method of positioning an inner member arranged on an inner circumferential side of an outer member and extending in a circumferential direction around an axis with respect to the outer member extending in the circumferential direction around the axis, the positioning method comprising:
a preparation step of preparing a positioning device including a pin that enters a pin insertion hole extending from the inner circumferential side to an outer circumferential side of the outer member and a groove recessed from an outer circumferential side to an inner circumferential side of the inner member, and a groove contact member coming into contact with a groove side surface of the groove;

an adjusted pin assembly step of assembling an adjusted pin obtained by assembling the groove contact member to the pin; and
a positioning device attachment step of inserting the adjusted pin into the pin insertion hole of the outer member and the groove of the inner member,
wherein the adjusted pin assembly step includes:
a concave portion formation step of forming, in one member of the pin and the groove contact member, a position restriction concave portion which is recessed in a direction away from the other member in a portion facing the other member; and
a member assembly step of placing the groove contact member so as to face the pin, and plastically deforming a portion of the other member as a claw portion so as to enter the position restriction concave portion and come in contact with the position restriction concave portion.

* * * * *